US012604182B2

(12) United States Patent
Vidyakina et al.

(10) Patent No.: US 12,604,182 B2
(45) Date of Patent: Apr. 14, 2026

(54) METHOD AND APPARATUS FOR GENERATING SUB-TRAJECTORIES FOR A TRAJECTORY

(71) Applicant: HERE Global B.V., Eindhoven (NL)

(72) Inventors: Elena Vidyakina, Berlin (DE); Elena Mumford, Eindhoven (NL); Johannes Braese, Berlin (DE)

(73) Assignee: HERE Global B.V., Eindhoven (NL)

( * ) Notice: Subject to any disclaimer, the term of this patent is extended or adjusted under 35 U.S.C. 154(b) by 122 days.

(21) Appl. No.: 18/399,066

(22) Filed: Dec. 28, 2023

(65) Prior Publication Data

US 2025/0220415 A1     Jul. 3, 2025

(51) Int. Cl.
| | |
|---|---|
| *H04W 12/00* | (2021.01) |
| *B60R 25/32* | (2013.01) |
| *H04W 12/02* | (2009.01) |

(52) U.S. Cl.
CPC ............. *H04W 12/02* (2013.01); *B60R 25/32* (2013.01)

(58) Field of Classification Search
CPC ....... H04W 12/02; H04W 12/00; B60R 25/32
USPC ...................................................... 701/32.6
See application file for complete search history.

(56) References Cited

U.S. PATENT DOCUMENTS

| | | | |
|---|---|---|---|
| 11,042,648 B2 | 6/2021 | Ostadzadeh et al. | |
| 11,526,628 B2 | 12/2022 | Bennati et al. | |
| 11,562,168 B2 | 1/2023 | Balu | |
| 2021/0372801 A1* | 12/2021 | Bennati | G01C 21/387 |
| 2021/0383022 A1* | 12/2021 | Bennati | G01C 21/3484 |
| 2022/0156869 A1* | 5/2022 | Bennati | H04W 12/02 |

OTHER PUBLICATIONS

Han et al., "Research on trajectory data releasing method via differential privacy based on spatial partition", Research Article, Security and Communication Networks, vol. 2018, Article ID 4248092, Nov. 1, 2018, 14 pages.
Office Action for related European Application No. 24222358.4-1218, dated May 22, 2025, 9 pages.
Liu et al., "SLAT: Sub-Trajectory Linkage Attack Tolerance Framework for Privacy-Preserving Trajectory Publishing", 2018 International Conference on Networking and Network Applications (NaNA), Oct. 12, 2018, pp. 298-303.

* cited by examiner

*Primary Examiner* — Shardul D Patel
(74) *Attorney, Agent, or Firm* — DITTHAVONG. STEINER, & MLOTKOWSKI

(57) ABSTRACT

An apparatus and a method for generating sub-trajectories for a trajectory are disclosed. The method includes retrieving trajectory data comprising a plurality of data points defining a trajectory and iteratively executing a set of operations until a termination condition is met. The set of operations include selecting an observation point associated with the plurality of data points and calculating a set of visible points comprising one or more data points from the plurality of data points associated with the observation point based on a predefined visibility context criterion. The method further includes identifying a changing point from the plurality of data points based on the iterative execution of the set of operations, and generating a sub-trajectory for the trajectory such that the changing point indicates a starting point of the sub-trajectory.

20 Claims, 13 Drawing Sheets

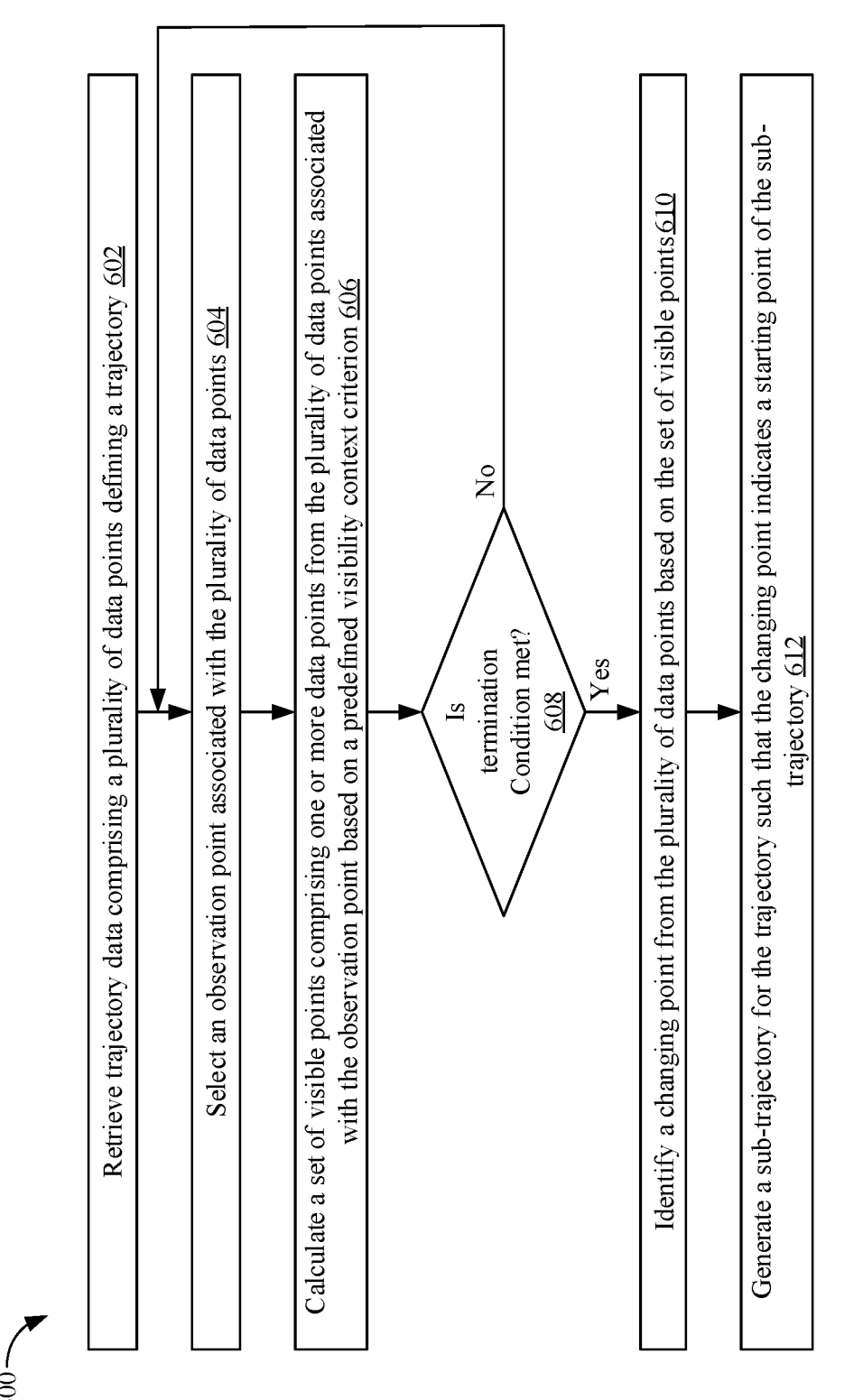

Retrieve trajectory data comprising a plurality of data points defining a trajectory 602

Select an observation point associated with the plurality of data points 604

Calculate a set of visible points comprising one or more data points from the plurality of data points associated with the observation point based on a predefined visibility context criterion 606

Is termination Condition met? 608

No

Yes

Identify a changing point from the plurality of data points based on the set of visible points 610

Generate a sub-trajectory for the trajectory such that the changing point indicates a starting point of the sub-trajectory 612

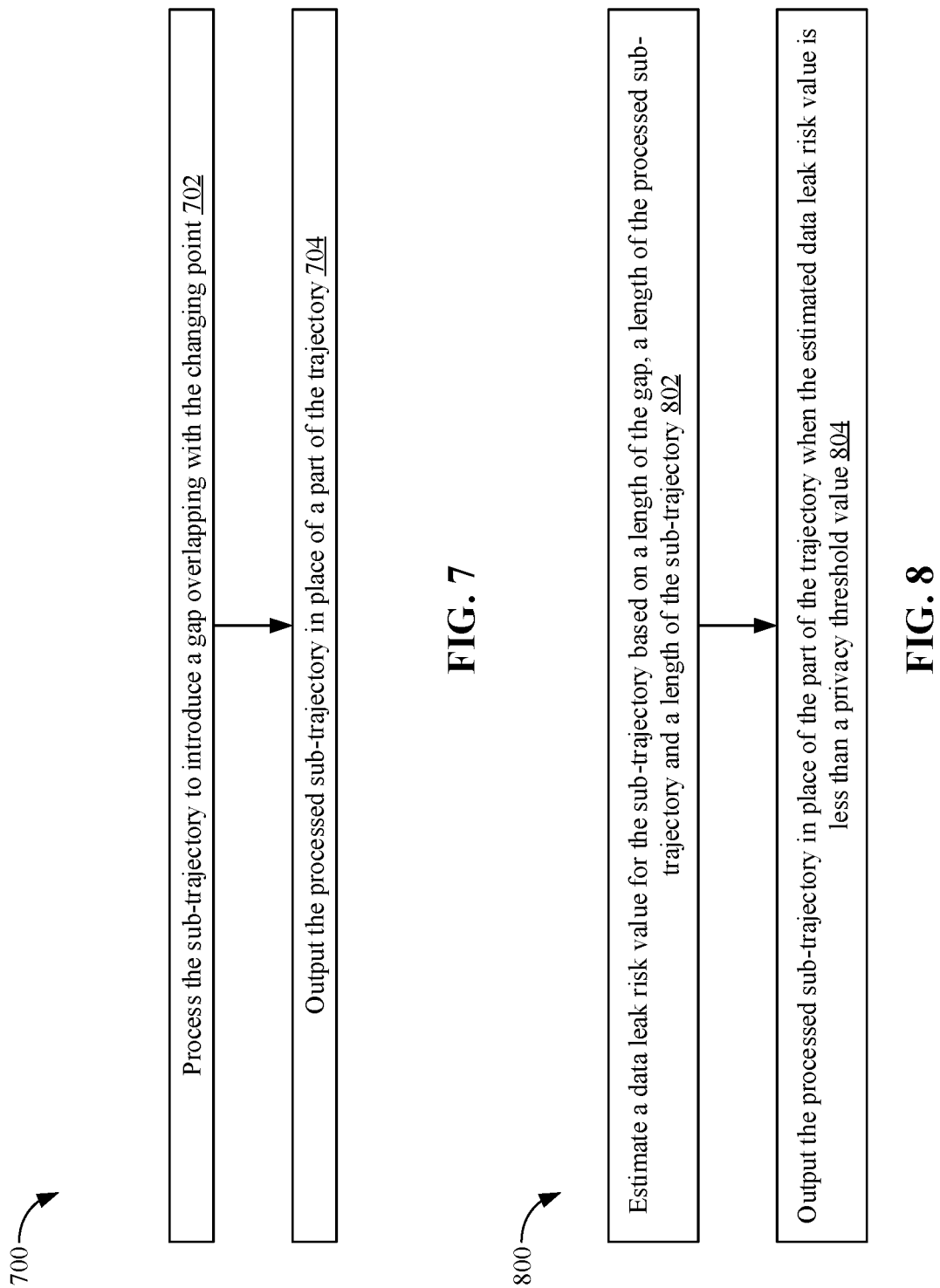

700

Process the sub-trajectory to introduce a gap overlapping with the changing point 702

Output the processed sub-trajectory in place of a part of the trajectory 704

Estimate a data leak risk value for the sub-trajectory based on a length of the gap, a length of the processed sub-trajectory and a length of the sub-trajectory 802

Output the processed sub-trajectory in place of the part of the trajectory when the estimated data leak risk value is less than a privacy threshold value 804

FIG. 8

METHOD AND APPARATUS FOR GENERATING SUB-TRAJECTORIES FOR A TRAJECTORY

BACKGROUND

Location-based services (LBS), e.g., real-time traffic information, fleet management, or navigation, operate on the basis of an analysis of mobility data that users of such services provide. In order to maximize the accuracy of the LBS, it is advantageous to collect as much mobility data of users as possible. However, this may be detrimental to the privacy of the users, resulting from inadvertent disclosure or misuse of their mobility data. The mobility data of the users may include trajectory information, which may reveal the user's personal information, including their home address, frequently visited places, preferred services and locations, and the like. If such information is leaked to a potential attacker, it may result in threats to the personal safety and property of the users.

To reduce this risk, LBS providers often apply privacy-enhancing algorithms to mobility data. Privacy-enhancing algorithms work by removing or altering privacy-revealing features from such data. However, the application of the privacy-enhancing algorithms typically renders the data less accurate and therefore less valuable for the LBS provider.

There is therefore a need for effective and efficient solutions that are capable of removing or altering privacy-revealing features from the mobility data of the users and, at the same time, preserving the utility of such mobility data.

Some Example Embodiments

It is an objective of some embodiments of the present disclosure to provide an effective and efficient solution capable of removing or altering privacy-revealing features from the mobility data of the users and preserving the utility of such mobility data. In order to minimize the risk of misuse of mobility data of users, some embodiments of the present disclosure provide for generating a plurality of sub-trajectories and publishing the plurality of sub-trajectories in place of the main trajectory for a user. The plurality of sub-trajectories are based on one or more changing points, such that each of the one or more changing points may indicate a starting point of a corresponding sub-trajectory of the plurality of sub-trajectories. Further, the plurality of sub-trajectories may be processed to introduce a gap at least at the one or more changing points. The sub-trajectories with starting points as the changing points are insufficient for a potential attacker to discern any personal or sensitive information, even when the potential attacker is aware of a point of crossing of the vehicle. As such, outputting and publishing the sub-trajectories in place of the main trajectory provides for anonymization of the sensitive and private data of the user of the vehicle.

An apparatus, a method, and a computer programmable product are provided for implementing the process for generating sub-trajectories for a trajectory. The method may be a computer-implemented method.

In one aspect, the method includes retrieving trajectory data comprising a plurality of data points defining a trajectory and iteratively executing a set of operations until a termination condition is met. The set of operations comprise: selecting an observation point associated with one of the plurality of data points and calculating a set of visible points comprising one or more data points from the plurality of data points, such that the set of visible points are associated with the observation point based on a predefined visibility context criterion. The method further comprises identifying a changing point from the plurality of data points based on the iterative execution of the set of operations until the termination condition is met, and generating a sub-trajectory for the trajectory such that the changing point indicates a starting point of the sub-trajectory.

In some embodiments, the changing point is identified based on a comparison between location information of the changing point and location information of a corresponding previous data point from the plurality of data points.

In some embodiments, the visibility context criterion is predefined based on map data associated with a location of the trajectory.

In some embodiments, the method further includes processing the sub-trajectory to introduce a gap overlapping with the changing point and outputting the processed sub-trajectory in place of a part of the trajectory. Further, the method may include estimating a data leak risk value for the sub-trajectory based on a length of the gap, a length of the processed sub-trajectory and a length of the sub-trajectory and outputting the processed sub-trajectory in place of the part of the trajectory when the estimated data leak risk value is less than a privacy threshold value. The method may alternatively also further include processing the sub-trajectory from the trajectory based on one or more anonymization parameters, such that the one or more anonymization parameters include at least the changing point and a gap length of the gap.

In some embodiments, the method further includes identifying one or more changing points from the plurality of data points based on the set a of visible points for each of the plurality of data points, and generating a plurality of sub-trajectories from the trajectory such that the one or more changing points indicate a starting point of a corresponding sub-trajectory. In an example, the set of visible points for each of the plurality of data points are determined based on the iterative execution of the set of operations until the termination condition is met.

In addition, the method may also include processing the plurality of sub-trajectories to introduce a gap overlapping with at least one changing point of the plurality of sub-trajectories and outputting the processed plurality of sub-trajectories in place of the trajectory. In addition or alternatively, when a minimum number of the plurality of sub-trajectories to be generated and a minimum gap length for the gap are predefined, the method may further include processing the plurality of sub-trajectories to introduce the gap overlapping with at least one changing point such that a number of changing points not replaced with the gap is minimized.

In addition, for various example embodiments described herein, the following is applicable: a computer program product may be provided. For example, a computer program product comprising instructions which, when executed by a computer, cause the computer to perform any one or any combination of methods, steps, operations, or processes disclosed herein.

In another aspect, an apparatus for generating sub-trajectories for a trajectory is disclosed. The apparatus includes at least one processor and at least one non-transitory memory including computer program code instructions. The computer program code instructions are configured to, when executed, cause the apparatus to retrieve trajectory data comprising a plurality of data points defining a trajectory and iteratively execute a set of operations until a termination condition is met. The set of operations comprise selecting an observation point associated with one of the plurality of data points and calculating a set of visible points comprising one or more data points from the plurality of data points, such that the set of visible points are associated with the observation point based on a predefined visibility context criterion. The computer program code instructions are further configured to, when executed, cause the apparatus to identify a changing point from the plurality of data points based on the iterative execution of the set of operations until the termination condition is met, and generate a sub-trajectory for the trajectory such that the changing point indicates a starting point of the sub-trajectory.

In some embodiments, the changing point is identified based on a comparison between location information of the changing point and location information of a corresponding previous data point from the plurality of data points.

In some embodiments, the visibility context criterion is predefined based on map data associated with a location of the trajectory.

In some embodiments, the computer program code instructions are configured to, when executed, cause the apparatus to process the sub-trajectory to introduce a gap overlapping with the changing point and output the processed sub-trajectory in place of a part of the trajectory. Further, the computer program code instructions may be configured to cause the apparatus to estimate a data leak risk value for the sub-trajectory based on a length of the gap, a length of the processed sub-trajectory and a length of the sub-trajectory and output the processed sub-trajectory in place of the part of the trajectory when the estimated data leak risk value is less than a privacy threshold value.

Furthermore, the computer program code instructions may also be configured to cause the apparatus to process the sub-trajectory from the trajectory based on one or more anonymization parameters, wherein the one or more anonymization parameters include at least the changing point, and a gap length of the gap.

In some embodiments, the computer program code instructions are configured to, when executed, cause the apparatus to identify one or more changing points from the plurality of data points based on a set of visible points for each of the plurality of data points, wherein the set of visible points for each of the plurality of data points are calculated during the iterative execution of the set of operations until the termination condition is met. The computer program code instructions are further configured to cause the apparatus to generate a plurality of sub-trajectories from the trajectory such that the one or more changing points indicate a starting point of a corresponding sub-trajectory.

In some embodiments, the computer program code instructions are configured to, when executed, cause the apparatus to process the plurality of sub-trajectories to introduce a gap overlapping with at least one changing point of the plurality of sub-trajectories, and output the processed plurality of sub-trajectories in place of the trajectory. According to some embodiments, when a minimum number of the plurality of sub-trajectories to generate and a minimum gap length for the gap are predefined, the computer program code instructions are further configured to cause the apparatus to process the plurality of sub-trajectories to introduce the gap overlapping with at least one changing point such that a number of changing points not replaced with the gap is minimized.

In some embodiments, the computer program code instructions may be configured to further cause the apparatus to perform steps in accordance with the aforementioned embodiments.

In yet another aspect, a computer program product including a non-transitory computer readable medium having stored thereon computer executable instructions that when executed by at least one processor, cause the processor to carry out operations for generating sub-trajectories for a trajectory is disclosed. The operations include retrieving trajectory data comprising a plurality of data points defining a trajectory and iteratively executing a set of operations until a termination condition is met. The set of operations comprise selecting an observation point associated with one of the plurality of data points, and calculating a set of visible points comprising one or more data points from the plurality of data points such that the set of visible points are associated with the observation point based on a predefined visibility context criterion. The operations further comprise identifying a changing point from the plurality of data points based on the iterative execution of the set of operations until the termination condition is met, and generating a sub-trajectory for the trajectory such that the changing point indicates a starting point of the sub-trajectory.

In some embodiments, the operations further comprise processing the sub-trajectory to introduce a gap overlapping with the changing point; and outputting the processed sub-trajectory in place of a part of the trajectory.

In some embodiments, the computer readable medium may further include instructions that, when executed, cause the processor to perform operations in accordance with the aforementioned embodiments.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or the mobile device side, or in any shared way between a service provider and mobile device with actions being performed on both sides.

For various example embodiments, the following is applicable: An apparatus comprising means for performing a method of the claims.

Still, other aspects, features, and advantages of the invention are readily apparent from the following detailed description, simply by illustrating a number of particular embodiments and implementations, including the best mode contemplated for conducting the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a flowchart that illustrates an exemplar method for generating sub-trajectories for a trajectory, in accordance with an embodiment of the disclosure;

FIG. 7 is a flowchart that illustrates an exemplar method of processing a portion of the trajectory and outputting the processed sub-trajectory, in accordance with an embodiment of the disclosure;

FIG. 8 is a flowchart that illustrates an exemplar method of estimating a data leak risk value and accordingly outputting the processed sub-trajectory, in accordance with an embodiment of the disclosure;

DESCRIPTION OF SOME EMBODIMENTS

Figure 1:
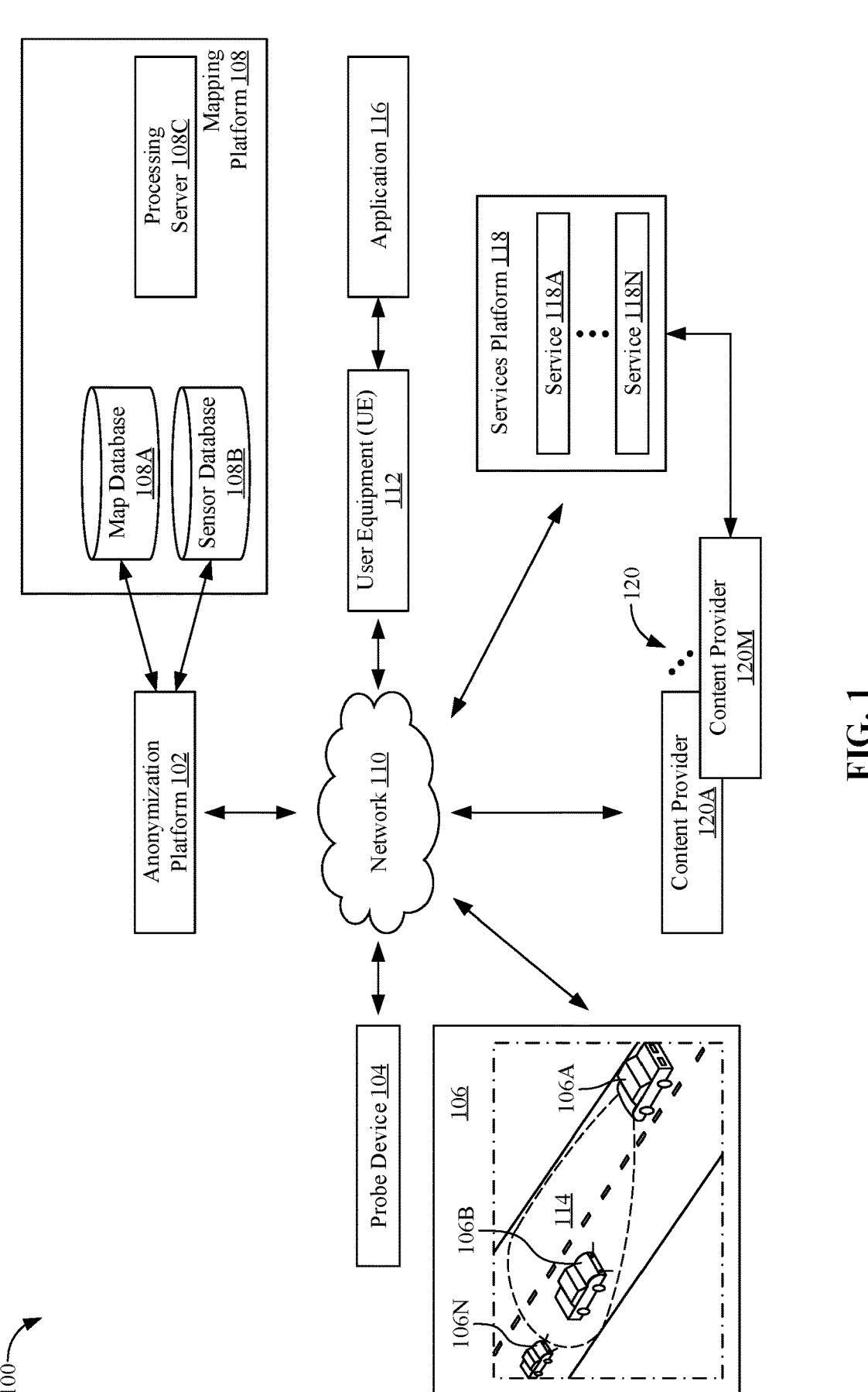
FIG. 1 is a diagram that illustrates a network environment for generating sub-trajectories for a trajectory, in accordance with an embodiment of the disclosure.

Examples of a system, method, and computer program for generating sub-trajectories for a trajectory are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The present disclosure relates to an apparatus, a method, and a computer programmable product for generating sub-trajectories for a trajectory. As mentioned above, there is a need for solutions that are capable of removing or altering privacy-revealing features from data, such as the mobility data of the users, and preserving the accuracy of the data. To this end, anonymization of data presents a solution that may be able to prevent an attacker from gaining any additional information (other than the background knowledge that attacker already has) from the anonymized dataset, in particular, for the attacker who may have access to secondary or background information about what occurs at locations and times that overlap with the LBS data that is to be anonymized. Such background information may be obtained, for example, by a person standing on a street and noting down license plates and time of each passing vehicle or a security camera looking onto a street.

In a scenario, where an attacker has seen a vehicle (e.g. a car) belonging to a user (e.g. "Mr. Smith") at a specific location at a particular time, if the dataset with Mr. Smith's trajectory is anonymized, then the attacker cannot gain any additional knowledge about Mr. Smith's trip, except for the points that are already known from the attacker's background knowledge. The background knowledge may have been obtained from direct observation or determined with high certainty from observed information. For example, a situation in which a sub-trajectory of two consecutive points of a trajectory within 10 seconds with the same identity (ID) is published and an attacker has the knowledge about only one of the points (e.g. based on information from speed cameras, hospital visit records, etc.), the attacker may be able to obtain information about the second point. Such a situation may indicate that the dataset is poorly anonymized. In reality, an attacker who has information about one point of a user (of a vehicle) may be able to make accurate assumptions about a part of trajectory of the user in the vicinity of this point, based on sequential structure of trajectory probe data, road network constraints, and visibility conditions from the point of observation.

The present disclosure provides for generating sub-trajectories for a trajectory. To this end, given a possible attacker's background knowledge, the trajectory of the user is anonymized in such a way that no additional information can be gained from the anonymized dataset using any single probe background information. Presuming an observer (may also have been referred to as "attacker" or "potential attacker" in this disclosure) is positioned at each probe point of an analyzed trajectory one by one, the information the observer is able to gain is a part of the trajectory that the observer is able to witness as a result of being present at a particular location and time.

The present disclosure provides a method of trajectory anonymization, based on a visibility partition of a trajectory. The method includes splitting the trajectory into a number of sub-trajectories associated with different identities (IDs), allowing for some gaps to be left/introduced between the sub-trajectories. The trajectory may be split in such a way that none of the anonymized sub-trajectories includes new information for a potential attacker located at a fixed point in space, independently of the specific background knowledge that an attacker might have. Further, embodiments of the present disclosure may be used for anonymity metric calculations and determining amount of new information (for example, in terms of 'seconds/meters') that may have been revealed in each published sub-trajectory that has been anonymized.

FIG. 1 is a diagram of a system 100 capable of generating sub-trajectories for a trajectory, according to one embodiment. The system 100 may include an anonymization platform 102. The anonymization platform 102 may be associated with a mapping platform 108. The mapping platform 108 may include a map database 108A, a sensor database 108B, and a processing server 108C. The system 100 may include a set of vehicles 106A-106N (hereinafter, collectively also referred to as set of vehicles 106). As such, the set of vehicles 106 may include a first vehicle 106A, a second vehicle 106B, up to an Nth vehicle 106N. The system 100 may further include a probe device 104. The probe device 104 may include a sensor, through which the probe device 104 may obtain trajectory data comprising a time-sequence of the plurality of data points representing a sensed spatial displacement of the probe device 104, thus defining a trajectory of the probe device 104. In some embodiments, the probe device 104 is a vehicle comprising the sensor, such as the vehicle 106. The system 100 may further include a user equipment (UE) 112, an applications 116, a services platform 118, one or more content providers 120 and a communication network 110. In some embodiments, the probe device 104 may be embodied as the user equipment (UE) 112, the UE 112 optionally being on board the vehicle 106. The services platform 118 may include, for example, a service 118A and a service 118N. The one or more content providers 120 may include, for example, a content provider 120A and a content provider 120M. The one or more content providers 120 or the services platform 118 may provide similar data and/or functionality to the sensor database 108B. The system 100 may further include a network 110. The set of vehicles 106 may be traveling on a road 114. In an embodiment, the anonymization platform 102 may be associated with each of the set of vehicles 106.

The anonymization platform 102 may include suitable logic, circuitry, interfaces, and/or code that may be configured to generate sub-trajectories for a trajectory. Specifically, the anonymization platform 102 may be configured to retrieve trajectory data comprising a plurality of data points defining a trajectory, for a vehicle of the set of vehicles 106. The anonymization platform 102 may be further configured to select an observation point associated with one of the plurality of data points and calculate a set of visible points comprising one or more data points from the plurality of data points associated with the observation point based on a predefined visibility context criterion. The anonymization platform 102 may be further configured to identify one or more changing points from the plurality of data points based on the set of visible points for each of the plurality of data points. Further, the anonymization platform 102 may be configured to generate a plurality of sub-trajectories for the trajectory such that each of the one or more changing points indicate a starting point of a corresponding sub-trajectory of the plurality of sub-trajectories. Examples of the anonymization platform 102 may include, but are not limited to, an electronic control unit (ECU), an electronic control module (ECM), a computing device, a mainframe machine, a server, a computer workstation, any and/or any other device with trajectory anonymization operations.

In an example embodiment, the anonymization platform 102 may be onboard each of the set of vehicles 106 and configured to generate sub-trajectories for a trajectory.

In another embodiment, the anonymization platform 102 may be embodied as a cloud-based service, a cloud-based application, a cloud-based platform, a remote server-based service, a remote server-based application, a remote server-based platform, or a virtual computing system. In yet another example embodiment, the anonymization platform 102 may be an OEM (Original Equipment Manufacturer) cloud. The OEM cloud may be configured to anonymize any data received by the anonymization platform 102.

In yet another embodiment, the anonymization platform 102 may be a part of or implemented by the mapping platform 108.

Each vehicle of the set of vehicles 106 may be a non-autonomous vehicle, a semi-autonomous vehicle, or a fully autonomous vehicle, for example, as defined by National Highway Traffic Safety Administration (NHTSA). Examples of the set of vehicles 106 may include, but are not limited to, a two-wheeler vehicle, a three-wheeler vehicle, a four-wheeler vehicle, more than four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The set of vehicles 106 may be a system through which an occupant (for example, a rider) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell-based car, a solar powered-car, or a hybrid car. It may be noted here that the four-wheeler diagram of the set of vehicles 106 are merely shown as examples in FIG. 1. The present disclosure may also be applicable to other structures, designs, or shapes of the set of vehicles 106. The description of other types of vehicles and respective structures, designs, or shapes has been omitted from the disclosure for the sake of brevity.

In some example embodiments, each vehicle of the set of vehicles 106 may include processing means such as a central processing unit (CPU), storage means such as on-board read-only memory (ROM), and random access memory (RAM), acoustic sensors such as a microphone array, position sensors such as a global positioning system (GPS) sensor, gyroscope, a light detection and ranging (LiDAR) sensor, a proximity sensor, motion sensors such as an accelerometer, an image sensor such as a camera, a display enabled user interface such as a touch screen display, and other components as may be required for specific functionalities of the set of vehicles 106. In some example embodiments, user equipment may be associated, coupled, or otherwise integrated with the set of vehicles 106, such as an advanced driver assistance system (ADAS), a personal navigation device (PND), a portable navigation device, and/or other devices that may be configured to provide route guidance and navigation-related functions to the user.

In some example embodiments, the probe device 104 may generate sensor data using the associated sensor. As mentioned above, the sensor data may correspond to the trajectory data obtained by the probe device 104. Sensor data of the probe device 104 may be data points defining a trajectory. Sensor data from the probe device 104 comprises at least location information, for example as a coordinate pair expressing latitude and longitude (e.g., WGS84 coordinates) corresponding to the location of the probe device 104. Furthermore, a timestamp corresponding to the moment at which the location information of the probe device 104 was determined may be comprised as part of the sensor data. In accordance with an embodiment, the sensor data may be generated by the probe device 104, when one or more sensors on-board the probe device 104 may sense information relating to, for example, the trajectory of the probe device 104. In accordance with an embodiment, the probe device 104 may be used in advance to obtain the trajectory data and transmit it to the anonymization platform 102 or store in the sensor database 108B. The trajectory data may include a time-sequence of the plurality of data points representing a sensed spatial displacement, corresponding to the sensor data of the probe device 104, thus defining a trajectory of the probe device 104.

In an embodiment, once the trajectory data is obtained and stored in the sensor database 108B, the trajectory data may be used in real-time for generating sub-trajectories for a trajectory.

The anonymization platform 102 may include suitable logic, circuitry, and interfaces that may be configured to receive, ingest, and (at least temporarily) store incoming trajectory data, such as the trajectory data incoming from probe device(s) 104. The trajectory data may be received in batches of multiple trajectories, via data streams, via an API, or the like. Further, the anonymization platform 102 may be configured to process and output trajectory data in accordance with embodiments described herein. Also, the anonymization platform 102 may be further configured to communicate with the mapping platform 108 or its components, such as with the map database 108A. In some embodiments, the anonymization platform 102 may be embodied as a chip or chip set. In other words, the anonymization platform 102 may include one or more physical packages (such as chips) that include materials, components and/or wires on a structural assembly (such as a baseboard). In yet other embodiments, the anonymization platform 102 may be embodied as a component of the mapping platform 108. In other embodiments, the anonymization platform 102 may be embodied as a local process executing on a processor on board a probe device 104, on a user equipment (UE) 112, or on board a vehicle 106.

The mapping platform 108 may include suitable logic, circuitry, and interfaces that may be configured to store, manage or updated one or more map attributes and sensor data associated with a geographical area, such as traffic on link segments and lane segments. The mapping platform 108 may be configured to store and update map data such as map attributes, link attributes, road attributes, and traffic entities, in the map database 108A. The mapping platform may be enabled to obtain traffic data pertaining to the aforementioned map data from e.g. a traffic data service. The mapping platform 108 may include techniques related to, but not limited to, geocoding, routing (multimodal, intermodal, and unimodal), clustering algorithms, machine learning in location-based solutions, natural language processing algorithms, and artificial intelligence algorithms. Data for different modules of the mapping platform 108 may be collected using a plurality of technologies including, but not limited to drones, sensors, connected cars, cameras, probes, and chipsets. In some embodiments, the mapping platform 108 may be embodied as a chip or chip set. In other words, the mapping platform 108 may include one or more physical packages (such as chips) that include materials, components and/or wires on a structural assembly (such as a baseboard).

Continuing further, the map database 108A and the sensor database 108B may include suitable logic, circuitry, and interfaces that may be configured to store the map data and the sensor data, respectively, that may be collected from an image source and/or the set of vehicles 106 traveling on a lane segment of the road 114, or in a region close to the lane segment. In accordance with an embodiment, such sensor data may be updated in real-time or near real-time such as within a few seconds, a few minutes, or on an hourly basis, to provide accurate and up-to-date sensor data. The sensor data may be collected from any sensor that may transmit such data to the anonymization platform 102 or the map database 108A of features within an environment that is appropriate for traffic-related services or mapping related services. For example, motion sensors, inertia sensors, image capture sensors, proximity sensors, LiDAR sensors, and ultrasonic sensors may be used to collect the sensor data.

The map database 108A may further be configured to store the traffic-related data and road topology and geometry-related data for a road network as map data. The map data may also include cartographic data, routing data, and maneuvering data. The map data may also include, but is not limited to, locations of intersections, diversions to be caused due to accidents, congestions or constructions, suggested roads, or links to avoid, and an estimated time of arrival (ETA) depending on different links. In accordance with an embodiment, the map database 108A may be configured to receive the map data including the road topology and geometry-related attributes related to the road network from external systems, such as one or more of background batch data services, streaming data services, and third-party service providers, via the network 110.

In accordance with an embodiment, the map data stored in the map database 108A may further include data about changes in traffic situations registered by GPS provider(s), such as, but not limited to, incidents, road repairs, heavy rains, snow, fog, time of day, day of a week, holiday or other events which may influence the traffic condition of a link segment.

In some embodiments, the map database 108A may further store historical probe data, in particular after anonymization, for events (such as, but not limited to, traffic incidents, construction activities, scheduled events, and unscheduled events) associated with Point of Interest (POI) data records or other records of the map database 108A.

For example, the data stored in the map database 108A may be compiled (such as into a platform specification format (PSF)) to organize and/or processed for generating navigation-related functions and/or services, such as route calculation, route guidance, map display, speed calculation, distance and travel time functions, navigation instruction generation, and other functions, by a navigation device, such as a user equipment. The navigation-related functions may correspond to vehicle navigation, pedestrian navigation, navigation to a favored parking spot, or other types of navigation. While example embodiments described herein generally relate to vehicular travel, example embodiments may be implemented for bicycle travel along bike paths, boat travel along maritime navigational routes, etc. The compilation to produce the end-user databases may be performed by a party or entity separate from the mapping platform 108. For example, a customer of a map developer using the mapping platform 108, such as a navigation device developer or other end user device developer, may perform compilation on the received map database 108A in a delivery format to produce one or more compiled navigation databases.

In some embodiments, the map database 108A may be a master geographic database configured on the side of the anonymization platform 102. In accordance with an embodiment, a client-side map database 108A may represent a compiled navigation database that may be used in or with end-user devices to provide navigation instructions based on the traffic data, the traffic conditions, speed adjustment, ETAs, and/or map-related functions to navigate through the intersection connected links on the route.

In some embodiments, the map data may be collected in advance, for example, by end-user vehicles (such as the set of vehicles 106) which use vehicles on-board one or more sensors to detect data about various entities such as road objects, lane markings, links, and the like. Additionally, data collection mechanisms like remote sensing, such as aerial or satellite photography may be used to collect the map data for the map database 108A.

For example, the map data may include map data associated with a location of the trajectory. Further, the map database 108A may include lane and intersection data records or other data that may represent link in the route, pedestrian lane, or areas in addition to or instead of the vehicle lanes. The lanes and intersections may be associated with attributes, such as geographic coordinates, street names, lane identifiers, lane segment identifiers, lane traffic direction, address ranges, speed limits, turn restrictions at intersections, and other navigation-related attributes, as well as POIs, such as fueling stations, hotels, restaurants, museums, stadiums, offices, auto repair shops, buildings, stores, and parks. The map database 108A may additionally include data about places, such as cities, towns, or other communities, and other geographic features such as, but not limited to, bodies of water, and mountain ranges. In general, the map database 108A may include data about structures that block visibility, including building footprints (corresponding to 3D buildings), (3D) building models, and other large structures. The store data may include a location of the structure, dimensions, spatial orientation, and the like.

In some example embodiments, images received from the image source may be stored within the map database 108A of the anonymization platform 102. In certain cases, the anonymization platform 102 may suitably process the received images. For example, such processing may include, suitably labeling the images based on corresponding associated lane and/or link, point of interest within the link and/or lane, and other information relating to the respective link and/or lane. Such labeled images may then be stored within the map database 108A as map data.

In an embodiment, the processing server 108C of the mapping platform 108 may include one or more processors configured to process data stored within the map database 108A and/or received by the mapping platform 108, such as from the anonymization platform 102, or the set of vehicle 106.

The anonymization platform 102 may be communicatively coupled to the set of vehicles 106 via the network 110. In an embodiment, the anonymization platform 102 may be communicatively coupled to other components not shown in FIG. 1 via the network 110. All the components in the system 100 may be coupled directly or indirectly to the network 110. The components described in the system 100 may be further broken down into more than one component and/or combined together in any suitable arrangement. Further, one or more components may be rearranged, changed, added, and/or removed.

The network 110 may be wired, wireless, or any combination of wired and wireless communication networks, such as cellular, Wi-Fi, internet, local area networks, or the like. In some embodiments, the network 110 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The embodiments disclosed herein address the aforementioned problems relating to minimizing risks associated with the privacy of users resulting from inadvertent disclosure or misuse of data, while collecting navigation data of vehicles to maximize the utility of the Location-based services (LBS). To reduce the risk, the LBS providers may apply privacy-enhancing techniques on the data that work by removing or altering privacy-revealing features from the data. However, the application of the privacy-enhancing techniques may render the data less accurate and therefore less usable or valuable for the LBS provider.

To this end, in operation, the anonymization platform 102 may be configured to retrieve trajectory data comprising a plurality of data points defining a trajectory, for a vehicle of the set of vehicles 106. The anonymization platform 102 may be further configured to iteratively execute a set of operations until a termination condition is met. In an example, the set of operations may include selecting an observation point associated with one of the plurality of data points and calculating a set of visible points comprising one or more data points from the plurality of data points associated with the observation point based on a predefined visibility context criterion. In some embodiments, the predefined visibility context criterion may be predefined based on map data associated with a location of the trajectory. In an example, the termination condition corresponds to a check for whether the set of operations are performed for each of the plurality of data points of the trajectory. For example, the termination condition is considered to be met when each of the plurality of data points have been selected as an observation point in corresponding iteration and a set of visible data points has been calculated for each of the plurality of data points. In some embodiments, the termination condition may be associated with the length or duration of the trajectory. For example, a termination condition may be met when a trajectory exceeds a predetermined length or duration (e.g after n kilometers, after t minutes, etc.).

The anonymization platform 102 may be further configured to identify one or more changing points from the plurality of data points based on the set of visible points for each of the plurality of data points. In some embodiments, the one or more changing points may be identified based on a comparison between location information of the one or more changing points and location information of a corresponding previous data point from the plurality of data points. The identification of changing points is explained in detail in conjunction with FIG. 5B. Further, the anonymization platform 102 may be configured to generate a plurality of sub-trajectories for the trajectory such that each of the one or more changing points indicate a starting point of a corresponding sub-trajectory of the plurality of sub-trajectories. Additionally, in some example implementations, the one or more changing points may indicate a position where a gap may be placed in the (outputted) processed sub-trajectory.

The anonymization platform 102 may be further configured to process the plurality of sub-trajectories to introduce a gap overlapping with the one or more changing points. Further, the anonymization platform 102 may be configured to output the plurality of processed sub-trajectories in place of the trajectory. By way of an example, outputting of the processed sub-trajectories may include outputting each of the plurality of processed sub-trajectories under a corresponding anonymized pseudonym, such that the anonymized pseudonym for each of the plurality of processed sub-trajectories is different.

The anonymization platform 102 may be further configured to estimate a data leak risk value for each of the plurality of sub-trajectories based on a corresponding length of the gap, a corresponding length of the processed sub-trajectory and a corresponding length of the sub-trajectory. Further, the anonymization platform 102 may be configured to output the plurality of processed sub-trajectories in place of the trajectory when the estimated data leak risk value is less than a privacy threshold value.

The anonymization platform 102 may be further configured to process the plurality of sub-trajectories from the trajectory based on one or more anonymization parameters. The one or more anonymization parameters may include at least: the one or more changing points and a gap length of the gap.

It should be noted that when a minimum number of the plurality of sub-trajectories to be generated and a minimum gap length for the gap are predefined, the anonymization platform 102 may be configured to process the plurality of sub-trajectories to introduce the gap overlapping with at least one changing point such that a number of changing points not replaced with the gap is minimized. Further, it should be noted that in some example implementations, the trajectory data may be collected from a sensor of a probe device. For example, the probe device may be a dedicated vehicle which is used particularly for the purpose of collecting the trajectory data. Alternately, the probe device may be any user-vehicle traveling on the road that is equipped with necessary equipment for collecting the trajectory data. Further, it should be noted that in some embodiments, the trajectory data may be predetermined and therefore stored in a database. The trajectory data may include a time-sequence of the plurality of data points representing a trajectory of the probe device.

Figure 2:
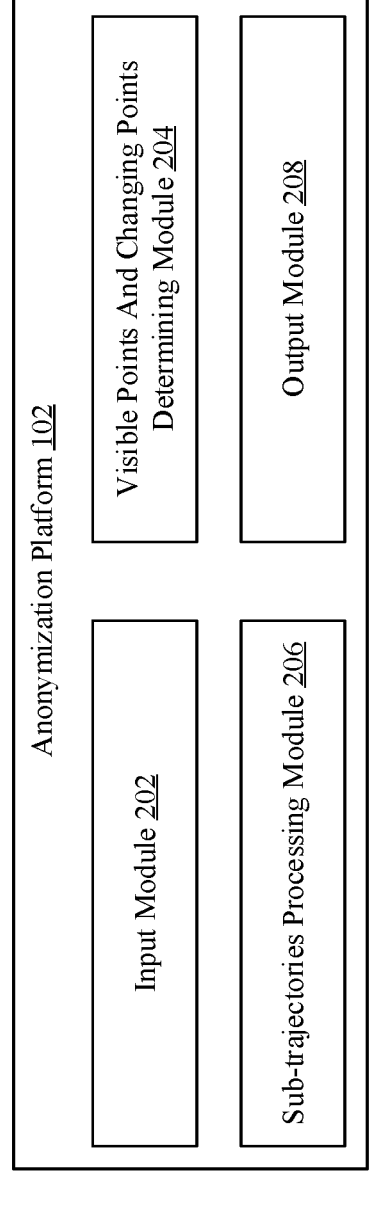
FIG. 2 illustrates a block diagram of the apparatus of FIG. 1, in accordance with an embodiment of the disclosure.

The components of the anonymization platform 102 for generation of sub-trajectories for a trajectory are described in FIG. 2.

FIG. 2 is a diagram of components of the anonymization platform 102 capable of generating sub-trajectories for a trajectory, according to one embodiment. In one embodiment, as shown in FIG. 2, the anonymization platform 102 of the system 100 includes one or more components for generating sub-trajectories for a trajectory according to the various embodiments described herein. It is contemplated that the functions of the components of the anonymization platform 102 may be combined or performed by other components of equivalent functionality. As shown, in one embodiment, the anonymization platform 102 includes an input module 202, a visible points and changing points determining module 204, a sub-trajectories processing module 206, and an output module 208. The above-presented modules and components of the anonymization platform 102 can be implemented in hardware, firmware, software, or a combination thereof. Though depicted as a separate entity in FIG. 1, it is contemplated that the anonymization platform 102 may be implemented as a module of any of the components of the system 100 (e.g., a component of the services platform 118, the content providers 120, the UE 112, the applications 116, and/or the like). In another embodiment, one or more of the modules 202-208 may be implemented as a cloud-based service, local service, native application, or combination thereof. The functions of the anonymization platform 102 and modules 202-208 are discussed with respect to the figures below.

In accordance with an embodiment, the anonymization platform 102 may store data that may be generated by the modules 202-208 while performing corresponding operations or may be retrieved from a database associated with the anonymization platform 102, such as the map database 108A and the sensor database 108B in a memory. For example, the data may include trajectory data, map data associated with a location of the trajectory, or a combination thereof.

The input module 202 may be configured to retrieve trajectory data comprising a plurality of data points defining a trajectory of a vehicle, for example, a vehicle of the set of vehicles 106. It should be noted that the trajectory data may have been collected from a sensor of a probe device. For example, the probe device may be a sensor installed on a probe vehicle that may have been used previously for collecting trajectory data for a particular geographical area. As such, the trajectory data may include a time-sequence of the plurality of data points representing a sensed spatial displacement of the probe device.

The visible points and changing points determining module 204 may be configured to calculate a set of visible points for each of the plurality of data points based on a predefined visibility context criterion. The visibility context criterion may be predefined based on map data associated with a location of the trajectory. The visible points and changing points determining module 204 may be further configured to identify one or more changing points from the plurality of data points based on the set of visible points for each of the plurality of data points. For example, the one or more changing points may be identified based on a comparison between location information of the one or more changing points and location information of a corresponding previous data point from the plurality of data points (as is explained in detail in conjunction with FIG. 5B).

The sub-trajectories processing module 206 may be configured to generate a plurality of sub-trajectories for the trajectory such that each of the one or more changing points indicates a starting point of a corresponding sub-trajectory of the plurality of sub-trajectories, or a position where a gap may be positioned in the (outputted) processed sub-trajectory. In some embodiments, additionally, the sub-trajectories processing module 206 may be configured to process the plurality of sub-trajectories to introduce a gap overlapping with the one or more changing points. Further, the sub-trajectories processing module 206 may be configured to estimate a data leak risk value for each of the plurality of sub-trajectories based on a corresponding length of the gap, a corresponding length of the processed sub-trajectory and a corresponding length of the sub-trajectory.

The sub-trajectories processing module 206 may be further configured to process the plurality of sub-trajectories from the trajectory based on one or more anonymization parameters. The one or more anonymization parameters may include at least the one or more changing points, and a gap length of the gap. It should be noted that when a minimum number of the plurality of sub-trajectories to be generated and a minimum gap length for the gap are predefined, the sub-trajectories processing module 206 may be further configured to process the plurality of sub-trajectories to introduce the gap overlapping with one of the one or more changing points such that a number of changing points not replaced with the gap is minimized.

The output module 208 may be configured to output the plurality of processed sub-trajectories in place of the trajectory. In some embodiments, in order to output the processed sub-trajectories, the output module 208 may output each of the plurality of processed sub-trajectories under a corresponding anonymized pseudonym. The anonymized pseudonym for each of the plurality of processed sub-trajectories may be different. Additionally, in some embodiments, the output module 208 may be configured to output the plurality of processed sub-trajectories in place of the trajectory when the estimated data leak risk value is less than a privacy threshold value. The privacy threshold value, for example, may be calibrated based on an analysis of utility to the user and privacy requirements of the user. Further, the privacy threshold value may be selected based on user preferences, for example, some users (e.g. companies) may be more privacy-cautious than others, and accordingly the privacy threshold value may differ. As such, the privacy threshold value may be indicative of the privacy risk for the user, and therefore may be predefined based on user preferences. For example, the privacy threshold value may be selected from a range of 0-1 or 0%-100%. The output module 208 may provide the anonymized sub-trajectories to a Location Based Service (LBS), such as a traffic service, a mobility analytics service (e.g. population count), a route planning service, a map generation service, or the like.

Figure 3:
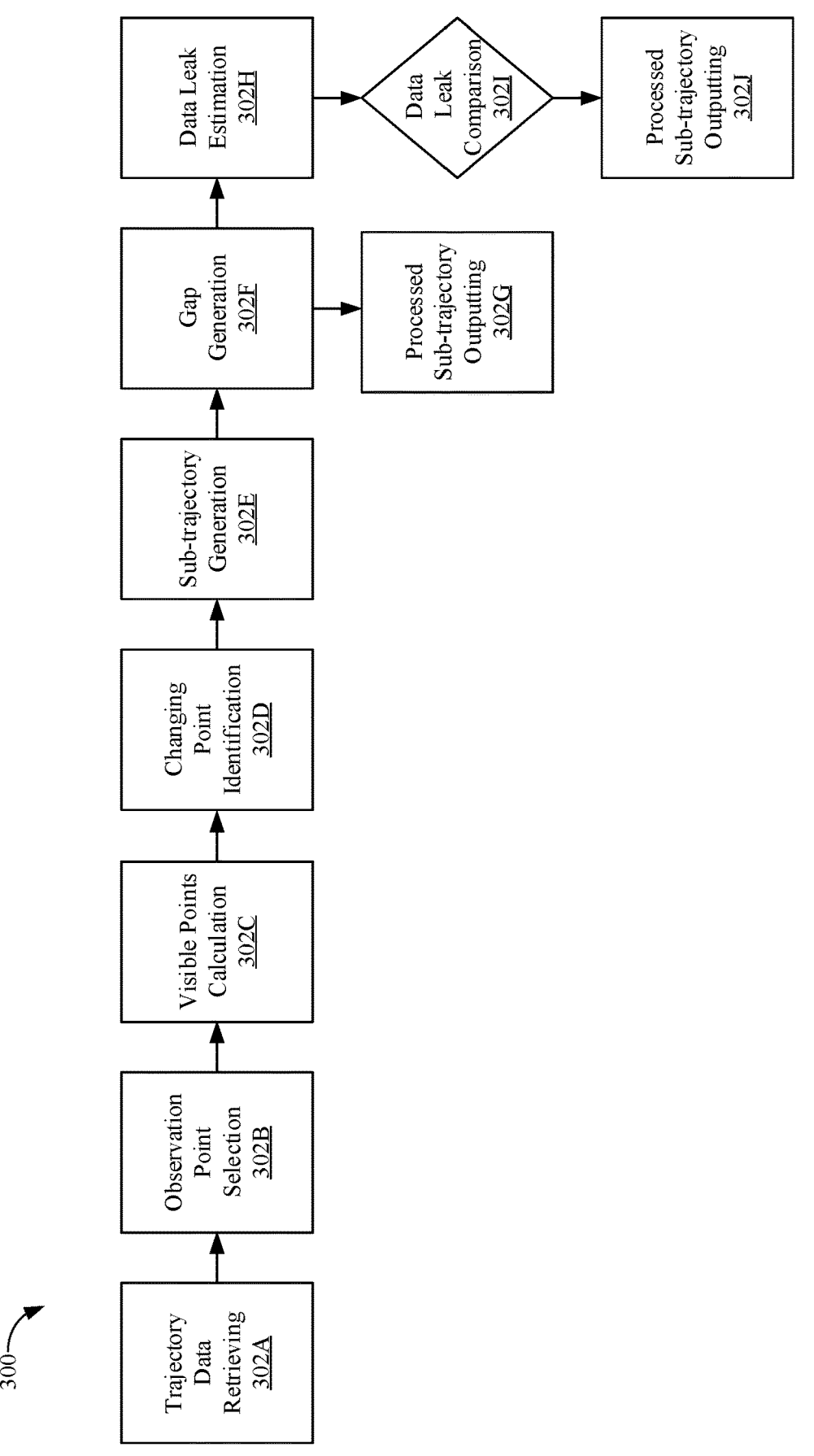
FIG. 3 is a diagram that illustrates exemplary operations for generating sub-trajectories for a trajectory, in accordance with an embodiment of the disclosure.

FIG. 3 is a block diagram 300 that illustrates exemplary operations for generating sub-trajectories for a trajectory, in accordance with an embodiment of the disclosure. FIG. 3 is explained in conjunction with elements from FIG. 1 and FIG. 2. With reference to FIG. 3, there is shown the block diagram 300 that illustrates exemplary operations from 302A to 302J, as described herein. The exemplary operations illustrated in the block diagram 300 may start at 302A and may be performed by any computing system, apparatus, or device, such as by the anonymization platform 102 of FIG. 1. Although illustrated with discrete blocks, the exemplary operations associated with one or more blocks of the block diagram 300 may be divided into additional blocks, combined into fewer blocks, or eliminated, depending on the particular implementation.

When a user of a vehicle (of the set of vehicles 106 or the probe device 104 or the user equipment 112) sets a route for navigation between a source location and a destination location, the route traversed by the vehicle comprises a time-sequence of a plurality of data points representing a sensed spatial displacement of vehicle. This data of the time-sequence of the plurality of data points forms the trajectory data of the vehicle. The route in that manner, is equivalently referred to as a trajectory of the vehicle (also, referred to as the main trajectory). If a potential attacker is able to physically witness the vehicle passing a known location in real time, there are chances of leakage of the trajectory data of the vehicle. The trajectory data may contain sensitive and private information about a user, and hence leakage of the trajectory data without anonymization may carry the risk of public availability of mobility pattern and mobility data of the user of the vehicle. As will be understood, in the above scenario, if the trajectory information is published (hence, known to the potential attacker), then by correlating the known location (where the vehicle is physically witnessed in real time by the potential attacker), the potential attacker may be able to estimate the user's sensitive information including user's habits and behaviors, and personal information including user's home or office address. It is, therefore, important to prevent the potential attacker from drawing a correspondence between the trajectory and the user of the vehicle. Therefore, it is necessary to consider applying privacy protection to trajectory data. Some anonymization techniques, such as k-anonymity techniques are generally adopted for the anonymization of trajectory data. Further, some techniques modify position information to achieve anonymity. However, modification sometimes produces inaccuracies in datasets. Further, some split-and-gap techniques split the trajectory of the vehicle into multiple parts (sub-trajectories) allowing for gaps between said multiple parts, however current techniques typically rely on parameters that may not apply gaps at effective places in the trajectory and/or may cause patterns that undermine the anonymization process.

To this end, the exemplary operations illustrated in the block diagram 300 aim to generate and publish an anonymized dataset corresponding to the trajectory of the user that prevents a potential attacker from drawing a correspondence between the trajectory and the user of the vehicle, and therefore prevent leakage of any sensitive of personal information about the user of the vehicle. By way of the exemplary operations illustrated in the block diagram 300, the trajectory is anonymized in such a way that even if the potential attacker has witnessed one of the probes (i.e., the visible parameters of the vehicles including entry, exit, license plate, etc.) from a point in a sub-trajectory and the potential attacker has likely already seen the whole sub-trajectory, still the potential attacker will not have learned any new information from the anonymized dataset. In accordance with the exemplary operations illustrated in the block diagram 300, in place of publishing the trajectory associated with the user, a plurality of sub-trajectories for the trajectory are generated and published. The plurality of sub-trajectories are based on one or more changing points, such that each of the one or more changing points may indicate a starting point of a corresponding sub-trajectory of the plurality of sub-trajectories or a position where a gap may be positioned in the (outputted) processed sub-trajectory. The exemplary operations illustrated in the block diagram 300 provide for trajectory anonymization, based on a visibility partition of the dataset. The exemplary operations aim, inter alia, to split the trajectories in such a way that none of the anonymized sub-trajectories includes new information for a potential attacker located at a fixed point in space, independently of the specific background knowledge an attacker might have. Further, the exemplary operations provide for anonymity metric calculation, i.e., measuring how much new information (for example, in seconds/meters) may have been revealed in each published sub-trajectory anonymized by different anonymization techniques.

At 302A, the trajectory data is retrieved. The trajectory data may include a plurality of data points defining the trajectory. As mentioned above, the trajectory data may either be obtained via the probe device (for example, a dedicated vehicle or a user-vehicle), or the trajectory data may be predetermined and therefore fetched from a database. In an embodiment, each data point of the plurality of data points of the trajectory data may be associated with a corresponding visibility set comprising a set of visible points. The visibility set comprises a set of points that are visible from the corresponding data point in context of the surroundings (e.g. road segments, intersections, adjacent structures, etc.) of the corresponding data point.

At 302B, an observation point selection operation may be performed. By way of an example, the observation point may be selected from the plurality of data points. However, it should be noted that, in some scenarios, the observation point may not be exactly co-located with a data point of the plurality of data points, and instead the observation point may be a point nearest (i.e., proximate) to the trajectory of the vehicle for which the plurality of data points are collected. For example, while the data point (for example, as captured by a probe device) may be located on a road, the observation point may be located on the sidewalk.

At 302C, a visible points calculation operation may be performed. In particular, at 302C, a set of visible points including one or more data points from the plurality of data points associated with the observation point may be selected based on a predefined visibility context criterion. It should be noted that the visible points calculation operation may be iteratively performed. In other words, the set of visible points may be calculated for each data point selected as an observation point, based on the predefined visibility context criterion. The set of visible points may be a subset of the data points in the same trajectory, that are visible from the observation point. In an embodiment, the visibility context criterion may be predefined based on map data associated with a location of the trajectory. As mentioned above, the map data associated with a location of the trajectory may have already been collected and stored in the map database 108A.

For example, when the first data point is selected as the observation point, some of the data points may qualify as the set of visible points. An observer who is present at a first data point will be able to observe a vehicle (e.g. a vehicle from the set of vehicles 106) following the trajectory T until a decision point (e.g. corner, intersection, etc.). As such, the observer at the first data point may be able to infer the subsequent sub-trajectory of the vehicle, based on the movement of the vehicle at the decision point (i.e., depending on whether the vehicle continues to move straight ahead, or takes a left or a right turn at the corner C). As such, the set of visible points corresponding to the first data point may be calculated as the data points occurring along the trajectory from the first data point until the corner C and the data points occurring on the trajectory from the corner C till next turn along the trajectory T. Operations 302B-302C are explained in detail in conjunction with FIG. 4A, FIG. 4B, and FIG. 4C.

It may be noted that the steps 302B and 302C, i.e., selection of an observation point and calculation of a set of visible points for the selected observation point, are performed iteratively until a termination condition is met. In other words, in each iteration, say a first iteration, a first data point from the plurality of data points is selected as an observation point. Further, a set of visible data points is calculated for the selected observation point, i.e., the first data point. Once the set of visible data points is calculated, a next iteration, say a second iteration may start, for example starting with the second data point. These iterations may be performed until each of the plurality of data points have been selected once as observation point. Subsequently, the termination condition is considered to be met when a set of visible data points is calculated for each of the plurality of data points in corresponding iterations.

Once the termination condition is met, the operations for generating sub-trajectories for the trajectory proceeds to 302D. At 302D, a changing point identification operation may be performed. In particular, at 302D, the changing point may be identified from the plurality of data points based on the set of visible points. The changing point may be identified based on a comparison between location information of the changing point and location information of a corresponding previous data point from the plurality of data points. The changing point may be the last data point for which the visibility context criterion is met. In other words, when the observation points along the trajectory are selected in a sequential manner from the plurality of data points in every iteration and the set of visible points are calculated for different observation points in each iteration based on a predefined visibility context criterion, then a last data point for which the predefined visibility context criterion is met may be identified as the changing point. Operation 302D is explained in detail in conjunction with FIG. 5A.

At 302E, a sub-trajectory generation operation may be performed. In other words, at 302E, a sub-trajectory may be generated for the trajectory such that the changing point indicates a starting point of the sub-trajectory or a position where a gap may be positioned in the (outputted) processed sub-trajectory. It should be further noted that the gap may be introduced to partially overlap with or replace the changing points. In some embodiments, each sub-trajectory may be generated based on the privacy threshold being met, and therefore, accordingly all the data points for which the privacy threshold is met may be removed. Once the sub-trajectories are generated, then the sub-trajectories may be published in place of the entire trajectory. As will be appreciated by those skilled in the art, the sub-trajectories with starting points as the changing points (identified at 302D) may be insufficient for a potential attacker to discern any personal or sensitive information even when the potential attacker is aware of a point of crossing of the vehicle (for example, by way of having physically observed the vehicle crossing one of the said point of crossing) and therefore provide for anonymization of the sensitive and private data of the user of the vehicle. As such, a plurality of sub-trajectories may be generated and published individually corresponding to the changing points, in place of the trajectory T. Therefore, the trajectory T may be split into a set of overlapping sub-trajectories, based on the changing points that indicate the beginnings of sub-trajectories or a position where a gap may be positioned in the (outputted) processed sub-trajectory. Operations 302E is explained in detail in conjunction with FIG. 5B.

At 302F, a gap generation operation may be performed. In other words, at 302F, the sub-trajectory (generated at 302E) may be processed to introduce a gap overlapping with the changing point. In an embodiment, the processing of the sub-trajectory from the trajectory may be based on one or more anonymization parameters. By way of an example, the one or more anonymization parameters may include at least the changing point and a gap length of the gap. As such, once a sub-trajectory is generated at 302E, thereafter, the sub-trajectory may be processed, so as to replace at least one associated changing point with a gap. In some example implementations, multiple data points may be replaced with a gap, and as such, the gap length may vary depending on the number of data points that are replaced with the gap. Operation 302F is further explained in detail in conjunction with FIG. 5C.

At 302G, the processed sub-trajectory may be output under a first anonymized pseudonym. As such, each of the plurality of sub-trajectories generated may be outputted with a unique ID. In other words, the ID of each sub-trajectory after the gap may be assigned a unique ID.

At 302H, a data leak estimation operation may be performed. In particular, at 302H, a data leak risk value for the sub-trajectory may be estimated based on the length of the gap, a length of the processed sub-trajectory, and a length of the sub-trajectory. Once the sub-trajectory has been generated and processed, using the above-mentioned operations to construct a visibility partition, the visibility partition may be used to approximate the amount of information provided to the potential attacker by each anonymized sub-trajectory. This amount of information provided may be considered as a metric of the data leak.

At 302I, a data leak comparison operation may be performed. In particular, the estimated data leak risk value may be compared with a privacy threshold value. For example, the privacy threshold value may be predefined.

At 302J, a processed sub-trajectory outputting operation may be performed. When the estimated data leak risk value is less than the privacy threshold value (based on comparison at 302I), then the processed sub-trajectory may be output in place of the part of the trajectory. As mentioned above, the sub-trajectories may be generated and outputted based on the privacy threshold being met, and all the data points for which the privacy threshold is met may be removed (i.e., replaced with a gap).

Figures 4A, 4B:
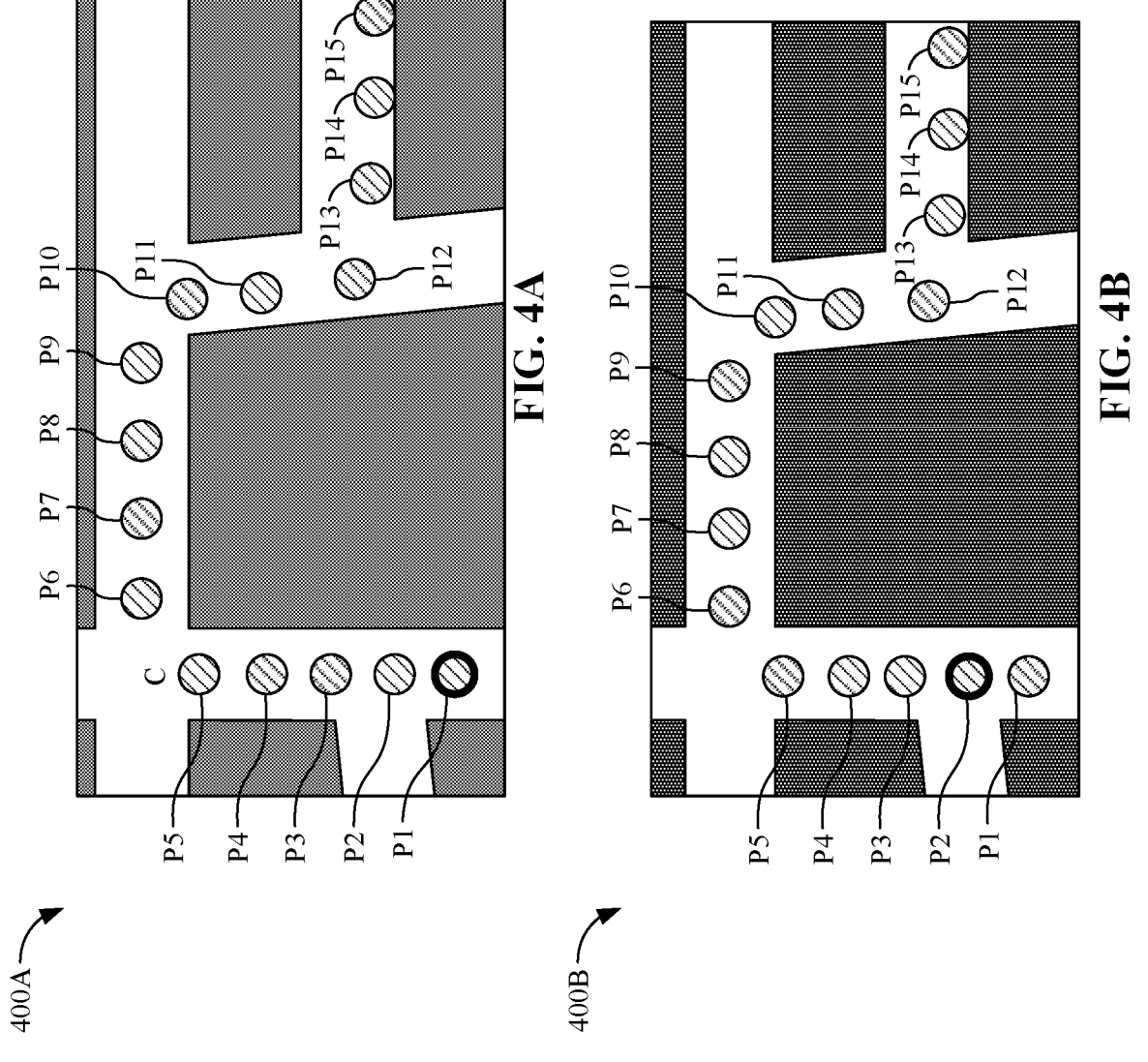
FIG. 4A, FIG. 4B, and FIG. 4C are diagrams, each of which depicts an exemplary trajectory including a plurality of data points and a set of visible points, with a different data point selected as an observation point, in accordance with an embodiment of the disclosure.
Figure 4C:
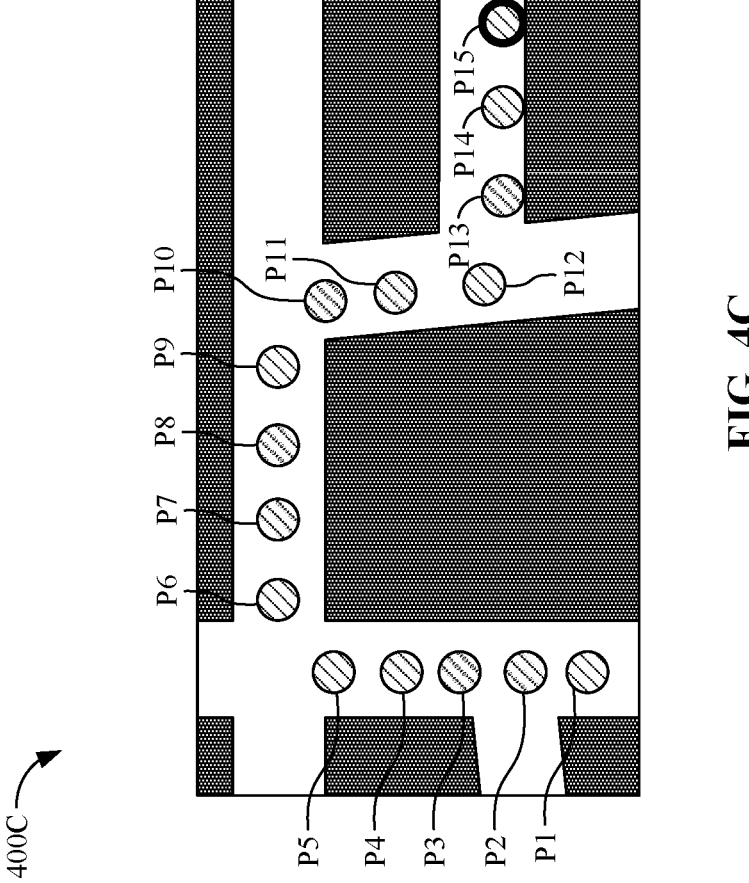

FIG. 4A, FIG. 4B, and FIG. 4C are diagrams 400A-400C, each of which depicts an exemplary trajectory T including a plurality of data points and a set of visible points, with a different data point selected as an observation point, in accordance with an embodiment of the disclosure. For example, in FIG. 4A, the trajectory T includes a plurality of data points P1, P2, . . . . P15 (also collectively referred to as plurality of data points P), with a first data point P1 (indicated with a ring outside the point) selected as the observation point. Similarly, in FIG. 4B, the trajectory T includes the plurality of data points P, with a second data point P2 (Indicated with a ring outside the point) selected as the observation point, and so on. Further, in FIG. 4C, the trajectory T includes the plurality of data points P, with a fifteenth data point P15 (indicated with a ring outside the point) selected as the observation point, and so on.

Each data point of the plurality of data points P of the trajectory T may be associated with an associated set of visible points. In order to understand the concept of visibility, it should be noted that, in a given two-dimensional (2D) representation of a three-dimensional (3D) scene, with each obstacle represented by its footprint, a first data point may be visible from a second data point, if the first data point lies within a visibility polygon of the second data point in the (lat, lon)-plane that may be defined as a set of all data points in a location that can be connected to the second data point with a straight line without intersecting any obstacles. As an example, ray-tracing methods from the field of computer graphics/gaming may be utilized to assess such a condition. The set of visible points may provide indications about a vehicle movement outside of visibility zone based on map data associated with a location of the trajectory. The trajectory T may be portioned into disjoint sequences Ti of probes such that within each such sequence Ti, all the data points have the same set of visible points. The sequence Ti may also be called a visibility partition of the trajectory T. A visibility partition of the dataset may be obtained by portioning the trajectory in the above manner. As such, FIG. 4A, FIG. 4B and FIG. 4C depict partitions based on visibility and map data associated with a location of the trajectory.

As shown in FIG. 4A, for the first data point P1 selected as the observation point, the data points P1, P2, P3, P4, P5, P6, P7, P8, P9 qualify as the set of visible points. For the first data point P1, the set of visible points are the data points of the trajectory T that are physically visible or can be inferred from the first data point P1. As will be understood, an observer who is present at the first data point P1 will be able to observe a vehicle (e.g. a vehicle from the set of vehicles 106) following the trajectory T until the decision point, corner C in the current example. Further, the observer at the first data point P1 may be able to infer the subsequent trajectory of the vehicle, based on the movement of the vehicle at the corner C (i.e., depending on whether the vehicle continues to move straight ahead, or takes a left or a right turn at the corner C). As such, the set of visible points corresponding to the first data point P1 may be calculated as the data points occurring along the trajectory from the first data point P1 until the corner C and the data points occurring on the trajectory from the corner C until the next decision point (e.g. intersection) along the trajectory T. Similarly, visible points for each of the plurality of data points P (through FIGS. 4B-4C) may be iteratively calculated, based on the above techniques. In particular, as shown in FIG. 4B, for the second data point P2 selected as the observation point, the data points P1, P2, P3, P4, P5, P6, P7, P8, P9 qualify as the set of visible points. Further, as shown in FIG. 4C, for the fifteenth data point P15 selected as the observation point, the data points P10, P11, P12, P13, P14, P15 qualify as the set of visible points.

Figures 5A, 5B:
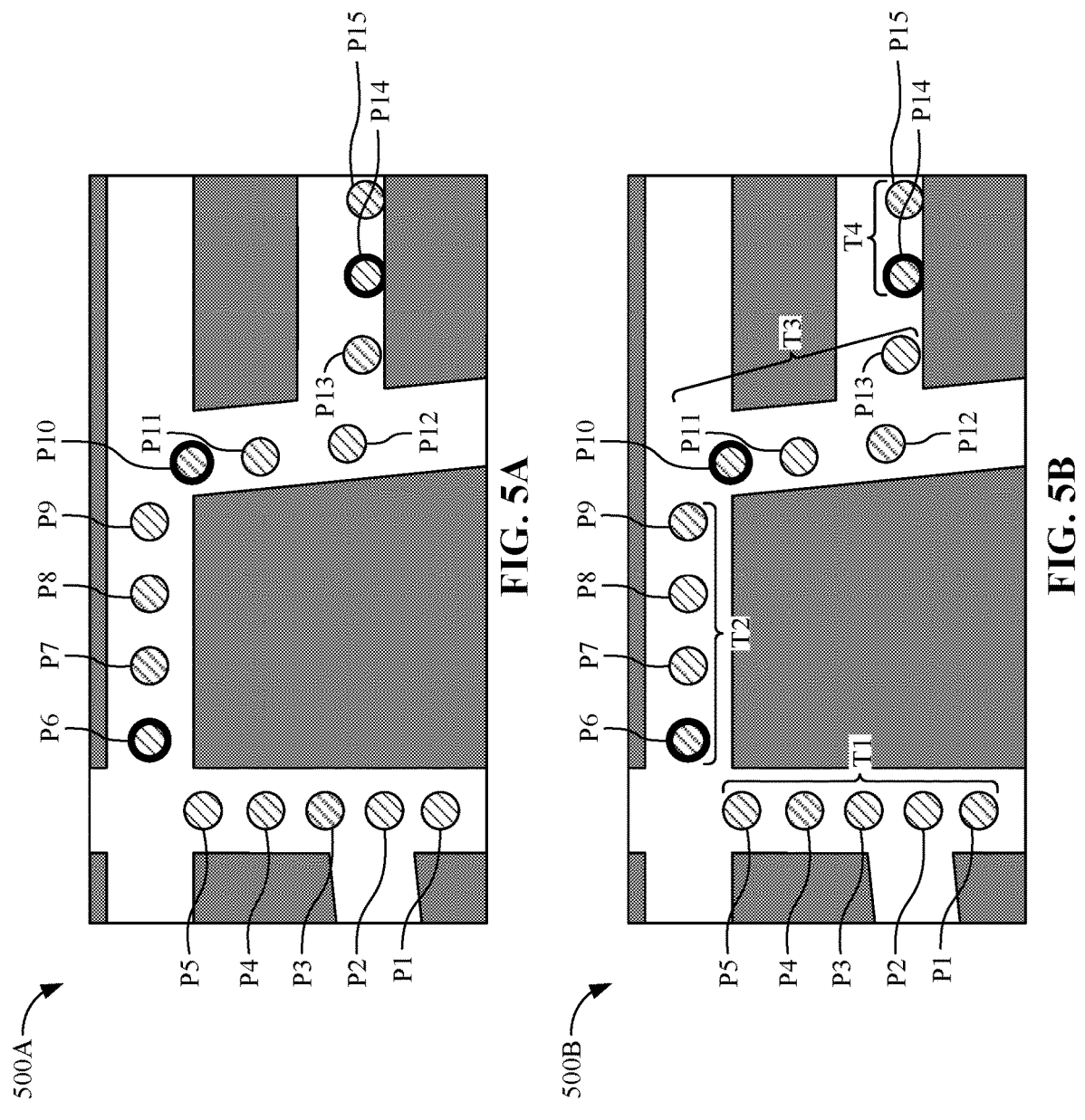
FIG. 5A is a diagram that illustrates a process of identification of changing point(s) in the trajectory, in accordance with an embodiment of the disclosure.
FIG. 5B is a diagram that illustrates a process of determining sets of visible points for the trajectory, in accordance with an embodiment of the disclosure.

FIG. 5A is a diagram 500A which depicts a process of identification of changing point(s) in the trajectory T, in accordance with an embodiment of the disclosure. FIG. 5A is explained together with FIG. 3, FIG. 4A, FIG. 4B and FIG. 4C. As shown in FIG. 4A, the trajectory T includes the plurality of data points P, with the first data point P1 (indicated with a ring outside the point) selected as the observation point. Similarly, as shown in FIG. 4B, the trajectory T includes the plurality of data points P, with the second data point P2 (indicated with a ring outside the point) selected as the observation point, and so on. As shown in FIG. 5A, the changing points may be identified as data points P6, P10, and P14 (indicated with a ring around the point). The changing points P6, P10, and P14 may be identified based on a comparison between location information of the changing point and location information of a corresponding previous data point from the plurality of data points P. In an example embodiment, the data points P6, P10, and P14 may be identified as the changing points since the location information of the said changing point happens to correspond to a different set of visible points when compared to the location information of the corresponding previous data point. In other words, in an example embodiment, the data points P6, P10, and P14 may be identified as the changing points since the data points P6, P10, and P14 happen to be at a decision point (e.g. corner, intersection) where the next set of visible points changes, for example where the trajectory T of the vehicle takes a turn and the previous set of visible points are no longer visible, as can be seen in FIG. 5A.

FIG. 5B is a diagram 500B which depicts a process of determining sets of visible points for the trajectory T, in accordance with an embodiment of the disclosure. FIG. 5A is explained together with FIG. 3, FIG. 4A, FIG. 4B, FIG. 4C, and FIG. 5A. As mentioned above, the changing points may mark a starting point of a sub-trajectory for the trajectory T. As shown in FIG. 5B, the data points (i.e., data points P1, P2, P3, P4, P5) lying before the changing point P6 may form a first set of visible points T1. Further, the data points (i.e., data points P6, P7, P8, P9) occurring from the changing point P6 and before the changing point P10 may form a second set of visible points T2. The data points (i.e., data points P10, P11, P12, P13) occurring from the changing point P10 and before the changing point P14 may form a third set of visible points T3. The data points (i.e., data points P14, P15) occurring from the changing point P14 and till the data point P15 may form a fourth set of visible points T4. As such, set of visible points T1, T2, T3, and T4 may be generated corresponding to the changing points (i.e., changing points P6, P10, and P14), for the trajectory T. Using the sets of visible points, the trajectory T may be split into a set of sub-trajectories, based on the changing points that indicate the beginnings of sub-trajectories. Further the changing points may indicate positions where gaps may be placed in the (outputted) processed sub-trajectory.

Figures 5C, 5D:
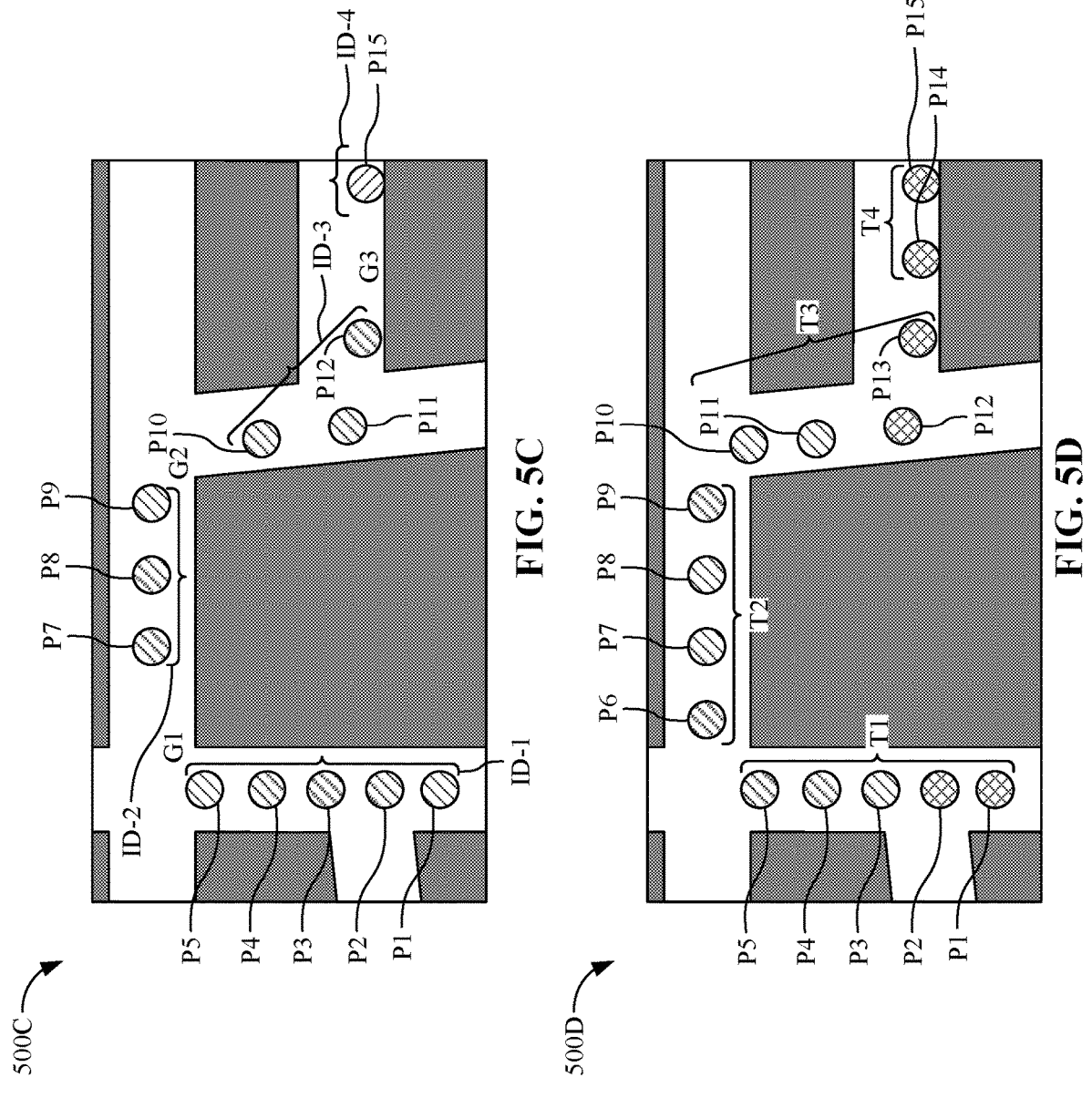
FIG. 5C is a diagram that illustrates an outcome of the anonymization process, in accordance with an embodiment of the disclosure.
FIG. 5D is a diagram that illustrates an exemplar scenario of an anonymized trajectory corresponding to a trajectory, in accordance with an embodiment of the disclosure.

FIG. 5C is a diagram 500C which depicts an outcome of the anonymization process, in accordance with an embodiment of the disclosure. FIG. 5C is explained together with FIG. 3, FIG. 4A, FIG. 4B, FIG. 4C, FIG. 5A, and FIG. 5B. As mentioned above and shown in FIG. 5A, the changing points P6, P10, and P14 may mark a starting point of a respective set of visible points for the trajectory T. Further, as shown in FIG. 5B, the data points P1, P2, P3, P4, P5 may form the first set of visible points T1, the data points P6, P7, P8, P9 may form the second set of visible points T2, the data points P10, P11, P12, P13 may form the third set of visible points T3, and the data points P14, P15 may form the fourth set of visible points T4. By way of operation 302F, the trajectory T may be processed to introduce a gap overlapping with the changing point, resulting in at least one sub-trajectory. As shown in FIG. 5C, the second portion of the trajectory comprising points P7, P8 and P9 may be processed to introduce a gap G1 (in place of the changing point P6). Further, the portion of the trajectory comprising points P10, P11 and P12 may be processed to introduce a gap G2 (in place of the changing point P10). Furthermore, the portion of the trajectory comprising P14 may be processed to introduce a gap G3 (in place of the changing point P14). As mentioned above, in other possible implementations, multiple data points may be replaced by the gap, and as such the gap length may vary depending on the number of data points that are replaced by the associated gap. Further, as mentioned above, upon processing, each of the plurality of resulting sub-trajectories may be outputted with a unique ID.

As shown in FIG. 5C, the first sub-trajectory T1 may be assigned an ID-1, the second sub-trajectory T2 may be assigned an ID-2, the third sub-trajectory T3 may be assigned an ID-3, and the fourth sub-trajectory T4 may be assigned an ID-4.

Although the present example describes removing or replacing the changing points by positioning gaps. However, this should not be construed as a limitation. In other examples, the gaps may be positioned to overlap a part of a changing point, or cover (partially or completely) data points neighboring to the changing point.

FIG. 5D is a diagram 500D which depicts an exemplary scenario for an anonymized trajectory corresponding to trajectory T (corresponding to FIGS. 4A-4C), in accordance with an embodiment. In FIG. 5D, data points P3, P4, P5, P6, P7, P8, P9, P10, P11 represent a sub-trajectory remained after anonymization, and the remaining points (P1, P2, P12, P13, P14, P15) represent deleted points from the raw trajectory. It is presumed that every partition Ti of the trajectory Tis in sequences, such that each such sequence provides a minimum amount of information to an observer placed at any point of the trajectory T. As such, if the potential attacker has observed one data point of a partition Ti, then the potential attacker may have observed an entire block associated with the partition Ti. Therefore, by combining some of the sequences into one sub-trajectory, new information may be potentially revealed to the potential attacker who may have observed only one block. To this end, the volume of additional information provided by the sub-trajectory to the potential attacker may be estimated. Further, an expected data leak size may be calculated by summing up the volumes multiplied by probabilities. To this end, the anonymized trajectories may be received for analysis. For example, the trajectories may have been anonymized using a split-and-gap approach. Further, the trajectories may be processed to determine if the gaps placed therein cover the changing points. The following metrics may be applied to determine the probability of the potential data leak. For example, for every sub-trajectory(S), an information (data) leak risk value, $I_S$ may be calculated using Equation (1), as below:

$$I_S = \frac{\sum \text{length}(T_i \cap S) \cdot \text{length}(S - T_i \cap S)}{\text{length}(S)} \qquad \text{Equation (1)}$$

In the above Equation (1), all $T_i$s belong to S. Further, the length may be either a duration, a distance, or an amount (number) of probe points or data points.

In other words, if the location of the potential attacker is not known, it is assumed that the potential attacker might have witnessed every probe point of sub-trajectory with the same probability. The probability that the potential attacker knows a part of the visibility partition $T_i$ is given by Equation (2) as below:

$$\frac{\text{length}(T_i \cap S)}{\text{length}(S)} \qquad \text{Equation (2)}$$

It is assumed the potential attacker has background knowledge of a part of the visibility partition and through observing the published sub-trajectory, the potential attacker may be able to connect additional datapoints to the background knowledge. This additional knowledge is given by Equation (3):

$$\text{length}(S - T_i \cap S) \qquad \text{Equation (3)}$$

The more additional points are connected higher is the potential of privacy leak. By summing over all parts of the visibility partition, a final metric may be calculated.

In an example scenario, for a function of length equal to the number of points, the information leak risk value may be estimated as follows:

$$I_S = \frac{3*6 + 4*5 + 2*7}{9} = \frac{52}{9} = 5.8$$

A measure of the leak for the whole dataset (D) may be the sum of the expected values divided by the total size of the set, as represented by Equation (4):

$$I_D = \frac{\sum I_S}{\sum \text{length}(S)} \qquad \text{Equation (4)}$$

where, $\cup S = D$

For the present example, if the whole dataset consists of only one sub-trajectory, the total leak may be calculated as:

$$I_D = \frac{5.8}{9} = 0.6$$

The visibility partition may be done either based on the original trajectory or based on anonymized sub-trajectories. These are potentially different partitions and may generate different values for the metric. When the potential adversary can "see" all probes of a trajectory after a turn until the next junction, then an anonymized dataset can potentially reveal new information to the adversary if the vehicle terminated its trip before the next junction. However, this situation may be overcome by removing all stay points.

FIG. 6 is a flowchart 600 that illustrates an exemplary method of generating sub-trajectories for a trajectory, in accordance with an embodiment of the disclosure. FIG. 6 is explained in conjunction with elements from FIG. 1, FIG. 2, FIG. 3, FIG. 4A, FIG. 4B, FIG. 4C, and FIG. 5A, FIG. 5B, FIG. 5C, and FIG. 5D. With reference to FIG. 6, there is shown a flowchart 600. The operations of the exemplary method may be executed by any computing system, for example, by the anonymization platform 102 of FIG. 1. The operations of the flowchart 600 may start at 602.

At 602, trajectory data comprising a plurality of data points defining a trajectory may be retrieved. It should be noted that the trajectory data may be collected from a sensor of a probe device. For example, the probe device may be a sensor installed on a probe vehicle that may have been used previously for collecting trajectory data for a particular geographical area. The trajectory data may include a time-sequence of the plurality of data points representing a sensed spatial displacement of the probe device 104. Further, as shown in FIG. 4A, FIG. 4B, and FIG. 4C, the trajectory data may include the plurality of data points P (representing a sensed spatial displacement of the probe device).

At 604, an observation point associated with a data point from the plurality of data points may be selected. By way of an example, an observation point associated with each of the plurality of data points may be selected during the method, at different stages of the method.

At 606, a set of visible points comprising one or more data points may be calculated from the plurality of data points associated with the observation point based on a predefined visibility context criterion. The visibility context criterion may be predefined based on map data associated with a location of the trajectory. As mentioned above, the map data associated with a location of the trajectory may be already collected and stored in the map database 108A. It should be noted that the set of visible points may be calculated iteratively for each of the plurality of data points based on the predefined visibility context criterion. Accordingly, operations 604 and 606 form a set of operations which are executed iteratively until a termination condition is met. Accordingly, at 608, a check is performed to identify if the termination condition is met. The termination condition may be a check on processing of each data point in the plurality of data points. Until all the data points of the plurality of data points are not processed, the termination condition is not met. Thus, at 608, if it is determined that the termination condition is not met, as indicated by the "No" branch, control of processing passes back to operation 604 and a next data point of the plurality of data points is selected as the observation. Further, the set of visible points is calculated for this next point selected as the observation point.

However, at 608, if it is determined that the termination condition is met, as indicated by the "Yes" branch, the control of processing is passed to 610. As mentioned before, other criteria may apply to meet the termination condition.

At 610, a changing point may be identified from the plurality of data points based on the set of visible points. The changing point is identified when the set of operations 604 and 606 have been executed iteratively until the termination condition is met. The changing point may be identified based on a comparison between location information of the changing point and location information of a corresponding previous data point from the plurality of data points. As shown in FIG. 5A, the changing points may be identified as data points P6, P10, and P14 (indicated with a ring around the point). For example, the data points P6, P10, and P14 may be identified as the changing points since the location information of the said changing point happens to be on a different lane as compared to the location information of the corresponding previous data point. In other words, the data points P6, P10, and P14 may be identified as the changing points since the data points P6, P10, and P14 happen to be at a corner where the trajectory T of the vehicle takes a turn, as can be seen in FIG. 5A. It should be noted that the one or more changing points may be iteratively identified from the plurality of data points based on the set of visible points for each of the plurality of data points. In other words, the step 610 of identifying the one or more changing points may be performed for each iteration of selecting the observation point associated with one of the plurality of data points and calculating the set of visible points associated with each of the observation points.

At 612, a sub-trajectory may be generated for the trajectory such that the changing point indicates a starting point of the sub-trajectory. Further, the changing point may indicate a position where a gap may be placed in the (outputted) processed sub-trajectory. Once the sub-trajectories are generated, then only the sub-trajectories may be published instead of the entire trajectory. As will be appreciated by those skilled in the art, the sub-trajectories with starting points as the changing points may be insufficient for a potential attacker to discern any personal or sensitive information even when the potential attacker is aware of a point of crossing of the vehicle (for example, by way of having physically observed the vehicle crossing one the said point of crossing) and therefore provides for anonymization of the sensitive and private data of the user of the vehicle. As shown in FIG. 5B, the data points P1, P2, P3, P4, P5 lying before the changing point P6 may form the first set of visible points T1, data points P6, P7, P8, P9 occurring from the changing point P6 and before the changing point P10 may form the second set of visible points T2, the data points P10, P11, P12, P13 occurring from the changing point P10 and before the changing point P14 may form the third set of visible points T3, and the data points P14, P15 occurring from the changing point P14 and till the data point P15 may form the fourth set of visible points T4. Corresponding sub-trajectories T1, T2, T3, and T4 may be generated and published individually corresponding to the changing points (i.e., changing points P6, P10, and P14), in place of the trajectory T. It should be noted that the plurality of sub-trajectories may be iteratively generated from the trajectory such that the one or more changing points indicate a starting point of a corresponding sub-trajectory or a position where a gap may be positioned in the (outputted) processed sub-trajectory. In other words, the step 612 of generating the sub-trajectories may be performed for each iteration of selecting the observation point, calculating the set of visible points associated with each of the observation points, and identifying the one or more changing points based on the set of visible points. In an embodiment, the method of the flowchart 600 may continue through additional steps that are explained in FIG. 7, and FIG. 8.

FIG. 7 is a flowchart 700 that illustrates an exemplary method of processing the sub-trajectory and outputting the processed sub-trajectory, in accordance with an embodiment of the disclosure. FIG. 7 is explained in conjunction with elements from FIG. 1, FIG. 2, FIG. 3, FIG. 4A, FIG. 4B, FIG. 4C, FIG. 5A, FIG. 5B, FIG. 5C, FIG. 5D, and FIG. 6. With reference to FIG. 7, there is shown a flowchart 700. The operations of the exemplary method may be executed by any computing system, for example, by the anonymization platform 102 of FIG. 1. The operations of the flowchart 700 may start at 702.

At 702, the sub-trajectory (generated at 612 in the flowchart 600) may be processed to introduce a gap overlapping with the changing point. In an embodiment, the sub-trajectory from the trajectory may be processed based on one or more anonymization parameters. The one or more anonymization parameters may include at least the changing point and a gap length of the gap. As such, the sub-trajectory may be processed to partially cover or replace at least one associated changing point with a gap. In some example implementations, multiple data points may be replaced or overlapped with a gap, and as such, the gap length may vary depending on the number of data points that are replaced, partially replaced, or overlapped with the gap. As shown in FIG. 5C, the second sub-trajectory T2 may be processed to introduce the gap G1 (in place of the changing point P6), the third sub-trajectory T3 may be processed to introduce gap G2 (in place of the changing point P10), and the fourth sub-trajectory T4 may be processed to introduce the gap G3 (in place of the changing point P14). In other possible implementations, multiple data points may also be replaced or overlapped by the gap, and as such the gap length may vary depending on the number of data points that are completely and/or partially replaced or overlapped by the associated gap. To that end, the gap indicates omission of data of the changing point from the trajectory data before saving in the map database 108A. In some embodiments, the gap may be placed such that it comprises more than one changing point.

In an example implementation, a minimum gap length for the gap may be predefined. In such example implementation, the plurality of sub-trajectories may be processed to introduce the gap overlapping with one of the one or more changing points, such that a number of changing points not replaced with the gap is minimized.

Further, it should be noted that the step 702 of processing the plurality of sub-trajectories to introduce the gap overlapping with at least one changing point of the plurality of sub-trajectories may be performed for each iteration of generating the sub-trajectory for each of the data points selected in association with the observation point, calculating a set of visible points associated with the observation point, and identifying a changing point based on the set of visible points.

At 704, the processed sub-trajectory may be output in place of a part of the trajectory. As will be appreciated by those skilled in the art, the sub-trajectories with starting points as the changing points may be insufficient for a potential attacker to discern any personal or sensitive information even when the potential attacker is aware of a point of crossing of the vehicle (for example, by way of having physically observed the vehicle crossing one the said point of crossing). As such, outputting and publishing the sub-trajectories in place of the trajectory provides for anonymization of the sensitive and private data of the user of the vehicle. In an embodiment, the processed sub-trajectory may be output under a first anonymized pseudonym.

It should be noted that the step 704 of outputting the processed sub-trajectory in place of a part of the trajectory may be performed for each iteration of generating the sub-trajectory for each of the data points selected in association with the observation point, calculating a set of visible points associated with the observation point, and identifying a changing point based on the set of visible points.

FIG. 8 is a flowchart 800 that illustrates an exemplary method of estimating a data leak risk value and accordingly outputting the processed sub-trajectory, in accordance with an embodiment of the disclosure. FIG. 8 is explained in conjunction with elements from FIG. 1, FIG. 2, FIG. 3, FIG. 4A, FIG. 4B, FIG. 4C, FIG. 5A, FIG. 5B, FIG. 5C, and FIG. 5D, FIG. 6, and FIG. 7. With reference to FIG. 8, there is shown a flowchart 800. The operations of the exemplary method may be executed by any computing system, for example, by the anonymization platform 102 of FIG. 1. The operations of the flowchart 800 may start at 802.

At 802, a data leak risk value for the sub-trajectory may be estimated. For example, the data leak risk value for the sub-trajectory may be estimated based on a length of the gap, a length of the processed sub-trajectory and a length of the sub-trajectory. This is already explained in conjunction with FIG. 5D.

At 804, the processed sub-trajectory may be output in place of the part of the trajectory when the estimated data leak risk value is less than a privacy threshold value. In other words, in some embodiments, a trajectory may only be published if the associated estimated data leak risk is deemed acceptable based on a pre-set privacy threshold value. Sub-trajectories outputted after this process may be deemed safe to use in connection with other downstream Location Based Services.

Accordingly, blocks of the flowcharts 600-800 support combinations of means for performing the specified functions and combinations of operations for performing the specified functions. It will also be understood that one or more blocks of the flowcharts 600-800, and combinations of blocks in the flowcharts 600-800, may be implemented by special-purpose hardware-based computer systems which perform the specified functions, or combinations of special-purpose hardware and computer instructions.

Alternatively, the anonymization platform 102 may include means for performing each of the operations described above. In this regard, according to an example embodiment, examples of means for performing operations may include, for example, a processor and/or a device or circuit for executing instructions or executing an algorithm for processing information as described above.

The above disclosure provides for various techniques for generating sub-trajectories for a trajectory. The techniques provide for measurable protection against background knowledge attacks. Further the techniques allow quantification of privacy added through anonymization in the context of an attacker without having to make assumptions about the de-anonymization algorithms employed by the attacker.

Returning to FIG. 1, as shown, the system 100 includes the services platform 118 for generation of the sub-trajectories. The services platform 118 may include one or more services, such as a service 118A and a service 118N. The content providers 120 may further include one or more content providers, such as a content provider 120A and a content provider 120M.

In one embodiment, the anonymization platform 102 has connectivity over the communication network 110 to the services platform 118 that provides the one or more services, such as the service 118A and the service 118N that can use the generated sub-trajectories for a trajectory for downstream functions. By way of example, the service 118A and the service 118N may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the service 118A and the service 118N uses the output of the anonymization platform 102 (e.g., the sub-trajectories for a trajectory stored in the map database 108A, maps stored in the map database 108A, etc.) to provide services such as navigation, mapping, traffic, other location-based services, etc. to the UE 112, the applications 116, and/or other client devices. In one embodiment, the services platform 118 may act as a content provider, analogously to content provider 120A, providing the sensor data to the anonymization platform 102, either directly or via the sensor database 108B. In some embodiments, the sensor database 108B may also be one of the content providers 120 or the services platform 118.

In one embodiment, the anonymization platform 102 may be a platform with multiple interconnected components. The anonymization platform 102 may include multiple servers, intelligent networking devices, computing devices, components, and corresponding software for generation of sub-trajectories for a trajectory according to the various embodiments described herein. In addition, it is noted that the anonymization platform 102 may be a separate entity of the system 100, a part of the mapping platform 108, a part of the service 118A and the service 118N, a part of the services platform 118, or included within components of the UE 112.

In one embodiment, the content providers 120 may provide content or data (e.g., the sensor data, related geographic data, etc.) to the mapping platform 108, the anonymization platform 102, the services platform 118, the service 118A and the service 118N, the UE 112, and/or the applications 116 executing on the UE 112. The content provided may be any type of content, such as sensor data, imagery, probe data, machine learning models, permutations matrices, map embeddings, map content, textual content, video content, image content, etc. In one embodiment, the content providers 120 may provide content that may aid in generation of sub-trajectories for a trajectory according to the various embodiments described herein. In one embodiment, the content providers 120 may also store content associated with the mapping platform 108, the anonymization platform 102, the services platform 118, the service 118A and the service 118N, and/or any other component of the system 100. In another embodiment, the content providers 120 may manage access to a central repository of data, and offer a consistent, standard interface to data, such as a repository of the map database 108A.

In one embodiment, the UE 112 may execute software applications 116 to use data associated with the sub-trajectories or other data derived therefrom according to the embodiments described herein. By way of example, the applications 116 may also be any type of application that is executable on the UE 112, such as autonomous driving applications, routing applications, mapping applications, location-based service applications, navigation applications, device control applications, content provisioning services, camera/imaging application, media player applications, social networking applications, calendar applications, and the like. In one embodiment, the applications 116 may function as a client for the anonymization platform 102 and perform one or more functions associated with generation of sub-trajectories for a trajectory alone or in combination with the anonymization platform 102.

By way of example, the UE 112 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 112 can support any type of interface to the user (such as "wearable" circuitry, etc.). In one embodiment, the UE 112 may be associated with or be a component of a vehicle or any other device.

In one embodiment, the UE 112 is configured with various sensors for generation of the sensor data, related geographic data, etc. By way of example, the sensors may include a global positioning sensor for gathering location data (e.g., GPS, GALILEO, BEIDOU, GLONASS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 112 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the UE 112 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 112 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the network 110 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In an embodiment, the UE 112 is configured as the probe device 104.

In another embodiment, the UE 112 comprises the probe device 104.

In an embodiment, the anonymization platform 102 is configured to run locally on the UE 112 or equivalently the probe device 104, such as in the form of an application or service installed on any of the UE 112 or the probe device 104.

By way of example, the anonymization platform 102, the services platform 118, the service 118A and the service 118N, the UE 112, the probe device 104, and/or the content providers 120 communicate with each other and other components of the system 100 using well known, new or still developing protocols. In this context, a protocol includes a set of rules defining how the network nodes within the network 110 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 9:
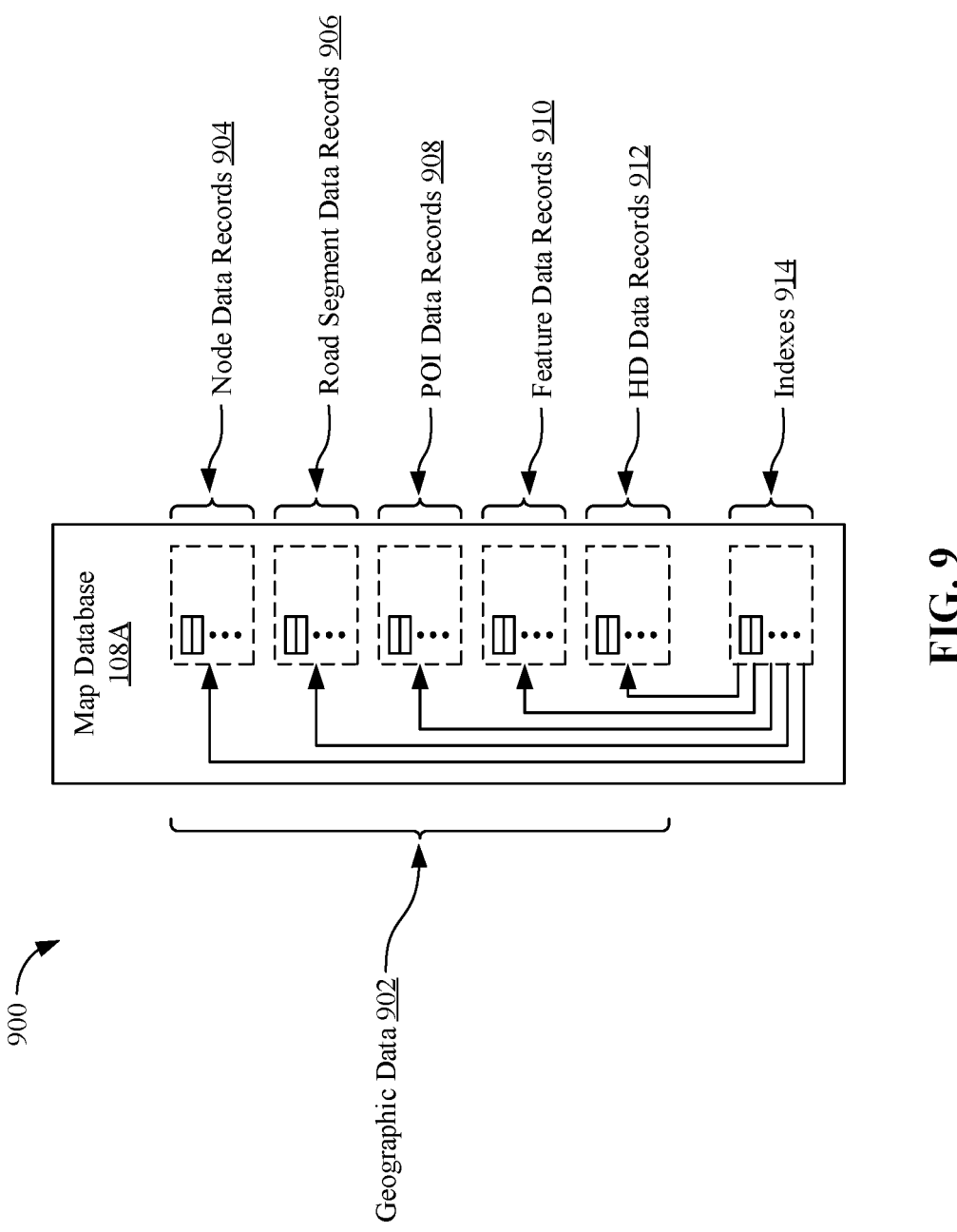
FIG. 9 is a diagram of a map database, according to one embodiment.

FIG. 9 is a diagram of the map database 108A, according to one embodiment. In one embodiment, the map database 108A includes geographic data 902 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 902. In one embodiment, the map database 108A includes high definition (HD) mapping data that provide centimeter-level or better accuracy of map features. For example, the map database 108A can be based on Light Detection and Ranging (LiDAR) or equivalent technology to collect billions of 3D points and model road surfaces and other map features down to the number lanes and their widths. In one embodiment, the HD mapping data (e.g., HD data records 912) and/or other mapping data of the map database 108A capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, topological features, buildings, building footprints, city blocks etc.)

used for determining visibility context criteria. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Similarly, topographical features such as hills, depressions, water bodies, etc., may be represented by a two-dimensional feature footprint, or by a three-dimensional shape (e.g. polygon extrusion, approximate shape including elevation data). Accordingly, the terms polygons and polygon extrusions as used herein can be used interchangeably. In some embodiments, data pertaining to such geographical features may be stored as node data records 904, road segment or link data records 906, POI data records 908, feature data records 910, and HD mapping data records 912, for example.

In one embodiment, the following terminology applies to the representation of geographic features in the map database 108A.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the map database 108A follows certain conventions. For example, links do not cross themselves and do not cross each other except at a node. Also, there are no duplicated shape points, nodes, or links. Two links that connect each other have a common node. In the map database 108A, overlapping geographic features are represented by overlapping polygons. When polygons overlap, the boundary of one polygon crosses the boundary of the other polygon. In the map database 108A, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the map database 108A includes node data records 904, road segment or link data records 906, POI data records 908, feature data records 910, HD mapping data records 912, and indexes 914, for example. More, fewer, or different data records can be provided. In some embodiments, the feature data records 910 may be stored in the map database 108A. In one embodiment, additional data records (not shown) can include cartographic ("carto") data records, routing data, and maneuver data. In one embodiment, the indexes 914 may improve the speed of data retrieval operations in the map database 108A. In one embodiment, the indexes 914 may be used to quickly locate data without having to search every row in the map database 108A every time it is accessed. For example, in one embodiment, the indexes 914 can be a spatial index of the polygon points associated with stored feature polygons. In one or more embodiments, data of a data record may be attributes of another data record.

In exemplary embodiments, the road segment data records 906 are links or segments representing roads, streets, paths, or bicycle lanes, as can be used in the calculated route or recorded route information for determination of speed profile data. The node data records 904 are end points (for example, representing intersections or an end of a road) corresponding to the respective links or segments of the road segment data records 906. The road segment data records 906 and the node data records 904 represent a road network, such as used by vehicles, cars, and/or other entities. Alternatively, the map database 108A can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The map database 108A can include data about the POIs and their respective locations in the POI data records 908. The map database 108A can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or map feature data can be part of the POI data records 708 or can be associated with POIs or POI data records 908 (such as a data point used for displaying or representing a position of a city).

In one embodiment, the map database 108A can also include the feature data records 910 for storing data associated with the sub-trajectories, and/or any other related data that is used or generated according to the embodiments described herein. By way of example, the feature data records 910 can be associated with one or more of the node records 904, the road segment records 906, and/or the POI data records 908 to associate the speed profile data records with specific places, POIs, geographic areas, and/or other map features. In this way, the linearized data records can also be associated with the characteristics or metadata of the corresponding records 904, 906, and/or 908.

In one embodiment, as discussed above, the HD mapping data records 912 model road surfaces and other map features to centimeter-level or better accuracy. The HD mapping data records 912 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 912 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 912 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 912.

In one embodiment, the HD mapping data records 912 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the map database 108A can be maintained by the content provider 120 in association with the anonymization platform 102 (e.g., a map developer or service provider). The map developer can collect geographic data to generate and enhance the map database 108A. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The map database 108A can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicle and/or the UE 112. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generating sub-trajectories for a trajectory may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
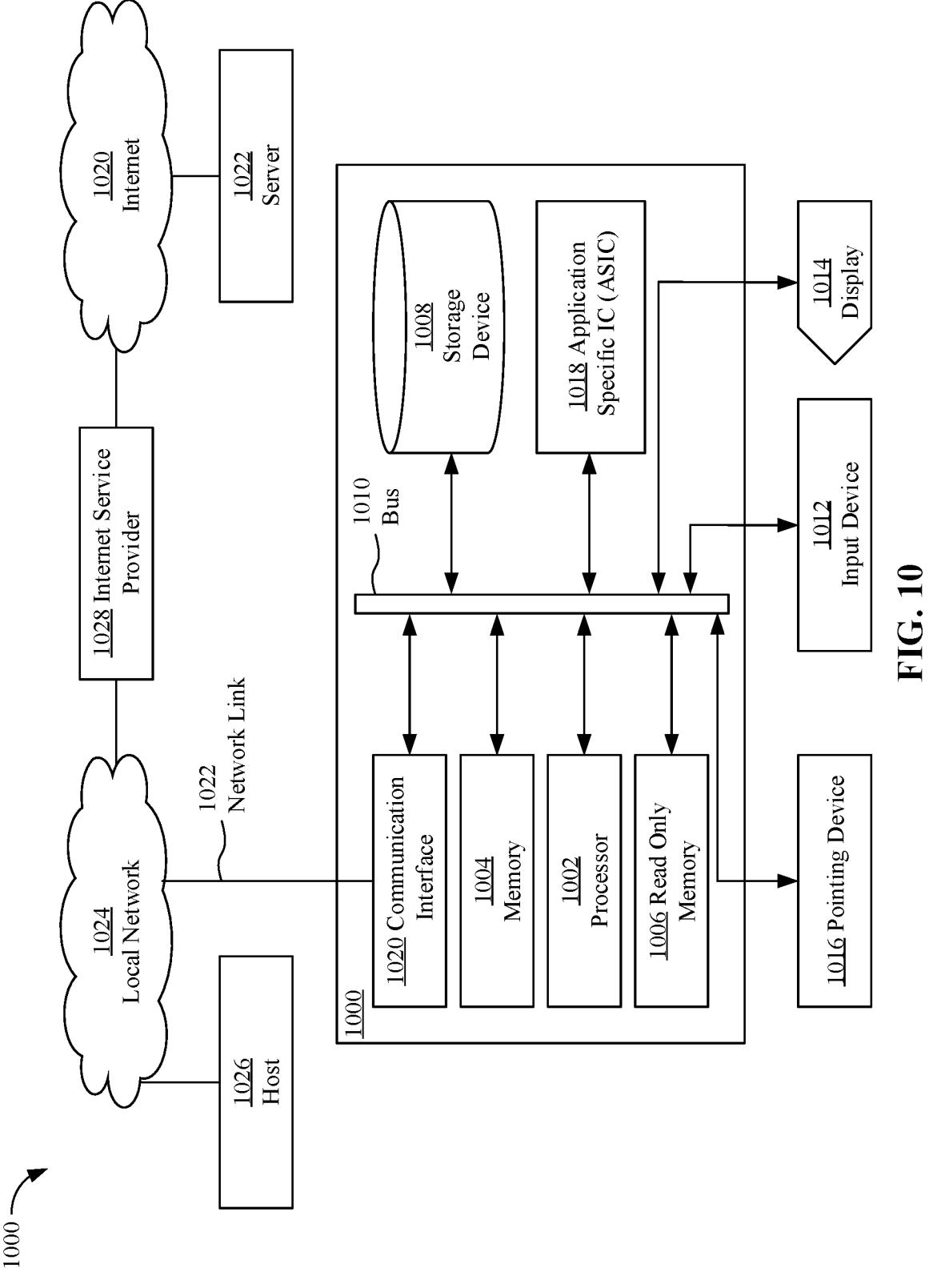
FIG. 10 is a diagram of hardware that can be used to implement an embodiment.

FIG. 10 is a diagram of hardware that can be used to implement an embodiment. Computer system 1000 is programmed (e.g., via computer program code or instructions) for generating sub-trajectories for a trajectory as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to generation of sub-trajectories for a trajectory. The computer program code is a set of instructions or statements providing instructions for the operation of the processor and/or the computer system to perform specified functions. The code, for example, may be written in a computer programming language that is compiled into a native instruction set of processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

The computer system 1000 also includes a memory 1004 coupled to bus 1010. The memory 1004, such as a random access memory (RAM) or other dynamic storage device, stores information including processor instructions for generating sub-trajectories for a trajectory. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, which is not changed by the computer system 1000. Some memory is composed of volatile storage that loses the information stored thereon when power is lost. Also coupled to the bus 1010 is a non-volatile (persistent) storage device 1008, such as a magnetic disk, optical disk, or flash card, for storing information, including instructions, which persists even when the computer system 1000 is turned off or otherwise loses power.

Information, including instructions for generating sub-trajectories for a trajectory, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1018, is coupled to the bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 1000 also includes one or more instances of a communications interface 1020 coupled to bus 1010. The communication interface 1020 provides a one-way or two-way communication coupling to a variety of external devices that operate with their own processors, such as printers, scanners, and external disks. In general, the coupling is with a network link 1022 that is connected to a local network 1004 to which a variety of external devices with their own processors are connected. For example, the communication interface 1020 may be a parallel port or a serial port or a universal serial bus (USB) port on a personal computer. In some embodiments, communications interface 1020 is an integrated services digital network (ISDN) card or a digital subscriber line (DSL) card or a telephone modem that provides an information communication connection to a corresponding type of telephone line. In some embodiments, the communication interface 1020 is a cable modem that converts signals on the bus 1010 into signals for a communication connection over a coaxial cable or into optical signals for a communication connection over a fiber optic cable. As another example, communications interface 1020 may be a local area network (LAN) card to provide a data communication connection to a compatible LAN, such as Ethernet. Wireless links may also be implemented. For wireless links, the communications interface 1020 sends or receives or both sends and receives electrical, acoustic, or electromagnetic signals, including infrared and optical signals, which carry information streams, such as digital data. For example, in wireless handheld devices, such as mobile telephones like cell phones, the communications interface 1020 includes a radio band electromagnetic transmitter and receiver called a radio transceiver. In certain embodiments, the communications interface 1020 enables connection to the communication network for generating sub-trajectories for a trajectory.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1022 typically provides information communication using transmission media through one or more networks to other devices that use or process the information. For example, the network link 1022 may provide a connection through local network 1004 to a host computer 1026 or to equipment 1028 operated by an Internet Service Provider (ISP). ISP equipment 1028 in turn provides data communication services through the public, world-wide packet-switching communication network of networks now commonly referred to as the Internet 1030.

A computer called a server host 1032 connected to the Internet hosts a process that provides a service in response to information received over the Internet. For example, server host 1032 hosts a process that provides information representing video data for presentation at display 1014. It is contemplated that the components of system can be deployed in various configurations within other computer systems, e.g., host 1026 and server 1032.

Figure 11:
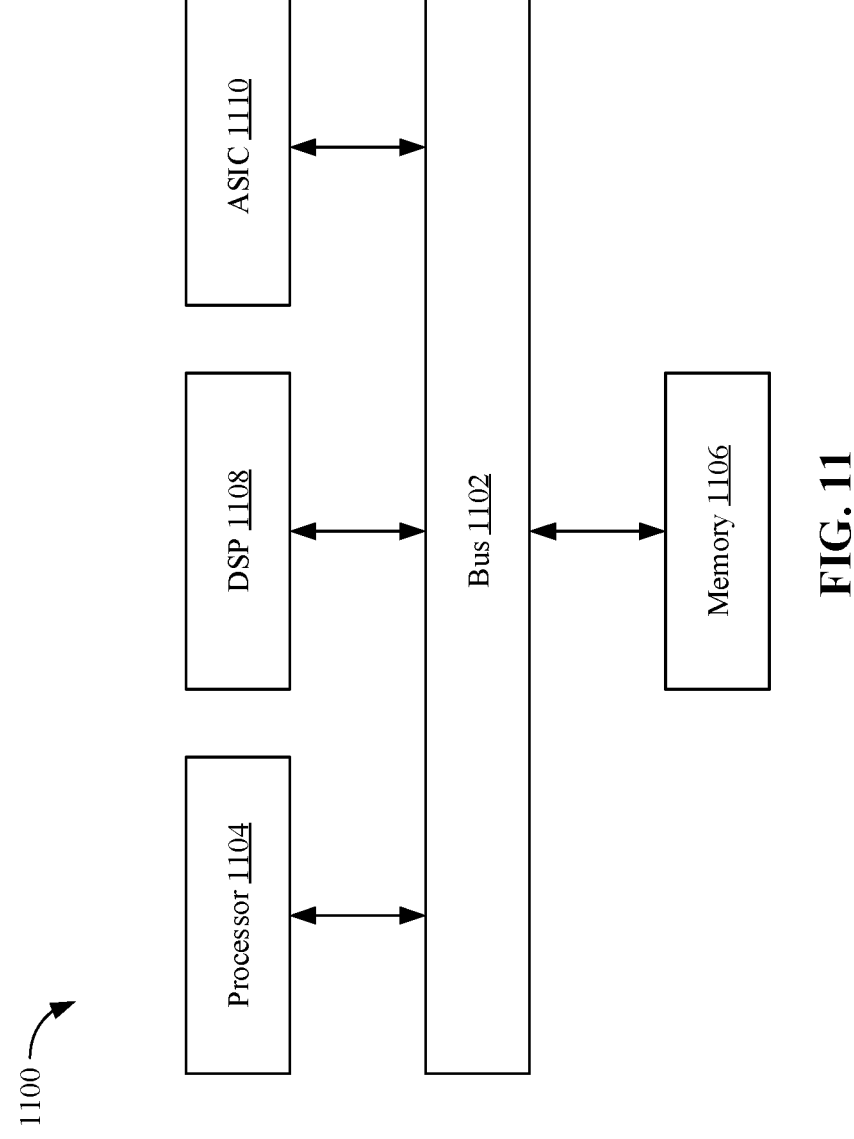
FIG. 11 is a diagram of a chip set that can be used to implement an embodiment.

FIG. 11 is a diagram of a chip set 1100 that can be used to implement an embodiment. The chip set 1100 is programmed to generate sub-trajectories for a trajectory, as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1102 for passing information among the components of the chip set 1100. A processor 1104 has connectivity to the bus 1102 to execute instructions and process information stored in, for example, a memory 1106. The processor 1104 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1104 may include one or more microprocessors configured in tandem via the bus 1102 to enable independent execution of instructions, pipelining, and multithreading. The processor 1104 may also be accompanied with one or more specialized components to perform certain processing functions and tasks such as one or more digital signal processors (DSP) 1108, or one or more application-specific integrated circuits (ASIC) 1110. A DSP 1108 typically is configured to process real-world signals (e.g., sound) in real time independently of the processor 1104. Similarly, an ASIC 1110 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1104 and accompanying components have connectivity to the memory 1106 via the bus 1102. The memory 1106 includes both dynamic memory (e.g., RAM, magnetic disk, writable optical disk, etc.) and static memory (e.g., ROM, CD-ROM, etc.) for storing executable instructions that when executed perform the inventive steps described herein to generate sub-trajectories for a trajectory. The memory 1106 also stores the data associated with or generated by the execution of the inventive steps.

Figure 12:
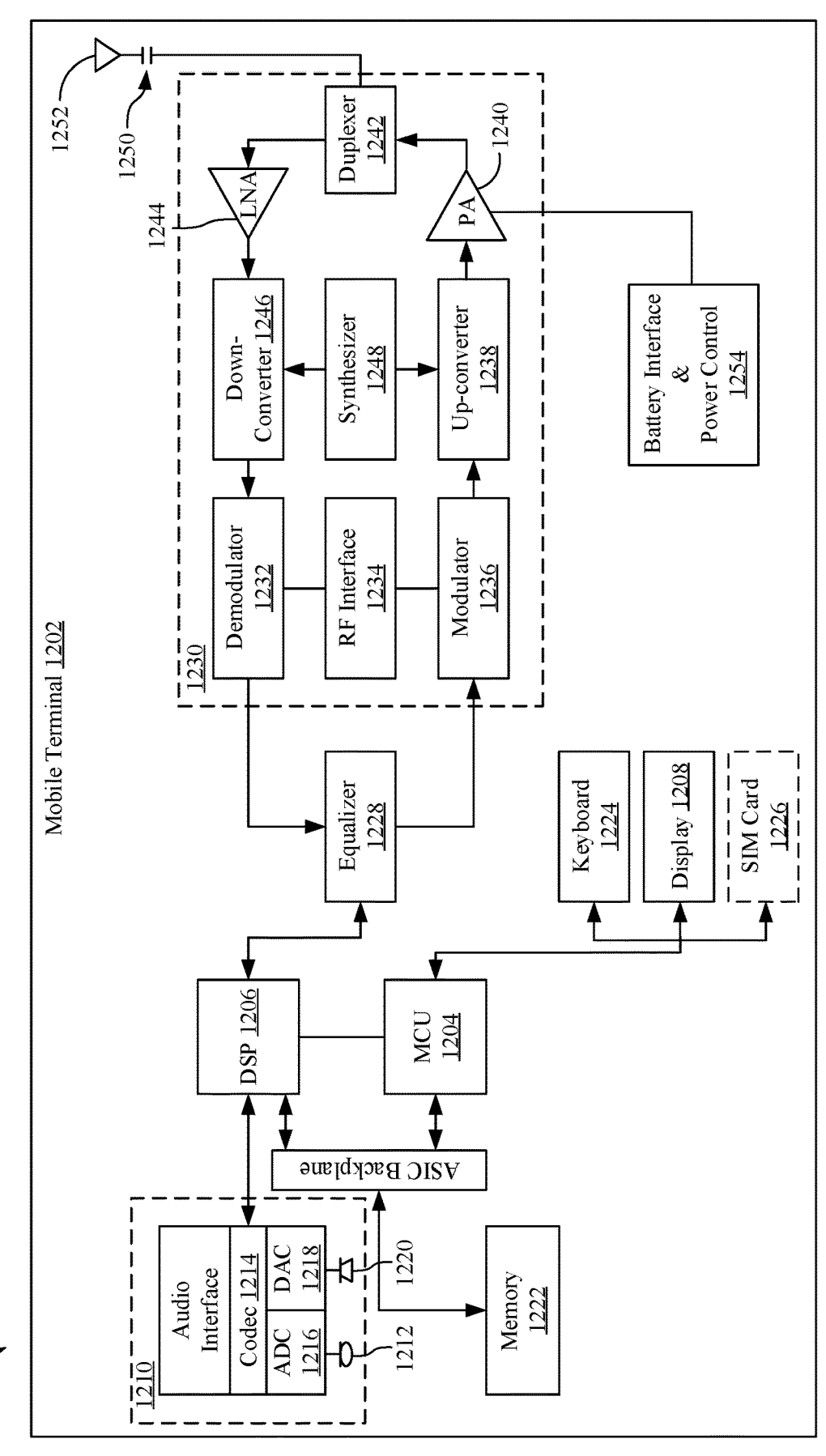
FIG. 12 is a diagram of a mobile terminal (e.g., handset, vehicle, or part thereof) that can be used to implement an embodiment.

FIG. 12 is a diagram of a mobile terminal 1202 (e.g., handset, vehicle, or part thereof) that can be used to implement an embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1204, a Digital Signal Processor (DSP) 1206, and a receiver/transmitter unit including a microphone gain control unit and a speaker gain control unit. A main display unit 1208 provides a display to the user in support of various applications and mobile station functions that offer automatic contact matching. An audio function circuitry 1210 includes a microphone 1212 and microphone amplifier that amplifies the speech signal output from the microphone 1212. The amplified speech signal output from the microphone 1212 is fed to a coder/decoder (CODEC) 1214.

A radio section 1230 amplifies power and converts frequency in order to communicate with a base station, which is included in a mobile communication system, via antenna 1252. The power amplifier (PA) 1240 and the transmitter/modulation circuitry are operationally responsive to the MCU, with an output from the PA 1240 coupled to the duplexer 1242 or circulator or antenna switch, as known in the art. The PA 1240 also couples to a battery interface and power control unit 1254.

In use, a user of mobile station 1202 speaks into the microphone 1212 and his or her voice along with any detected background noise is converted into an analog voltage. The analog voltage is then converted into a digital signal through the Analog to Digital Converter (ADC) 1216. The control unit 1204 routes the digital signal into the DSP 1206 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (Wi-Fi), satellite, and the like.

The encoded signals are then routed to an equalizer 1228 for compensation of any frequency-dependent impairments that occur during transmission though the air such as phase and amplitude distortion. After equalizing the bit stream, the modulator 1236 combines the signal with an RF signal generated in the RF interface 1234. The modulator 1236 generates a sine wave by way of frequency or phase modulation. In order to prepare the signal for transmission, an up-converter 1238 combines the sine wave output from the modulator 1236 with another sine wave generated by a synthesizer 1248 to achieve the desired frequency of transmission. The signal is then sent through a PA 1240 to increase the signal to an appropriate power level. In practical systems, the PA 1240 acts as a variable gain amplifier whose gain is controlled by the DSP 1206 from information received from a network base station. The signal is then filtered within the duplexer 1242 and optionally sent to an antenna coupler 1250 to match impedances to provide maximum power transfer. Finally, the signal is transmitted via antenna 1252 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1202 are received via antenna 1252 and immediately amplified by a low noise amplifier (LNA) 1244. A down-converter 1246 lowers the carrier frequency while the demodulator 1232 strips away the RF leaving only a digital bit stream. The signal then goes through the equalizer 1228 and is processed by the DSP 1206. A Digital to Analog Converter (DAC) 1218 converts the signal and the resulting output is transmitted to the user through the speaker 1220, all under control of a Main Control Unit (MCU) 1204—which can be implemented as a Central Processing Unit (CPU) (not shown).

The MCU 1204 receives various signals including input signals from the keyboard 1224. The keyboard 1224 and/or the MCU 1204 in combination with other user input components (e.g., the microphone 1212) comprise a user interface circuitry for managing user input. The MCU 1204 runs a user interface software to facilitate user control of at least some functions of the mobile station 1202 for generating sub-trajectories for a trajectory. The MCU 1204 also delivers a display command and a switch command to the display 1208 and to the speech output switch controller, respectively. Further, the MCU 1204 exchanges information with the DSP 1206 and can access an optionally incorporated SIM card 1226 and a memory 1222. In addition, the MCU 1204 executes various control functions required of the station. The DSP 1206 may, depending upon the implementation, perform any of a variety of conventional digital processing functions on the voice signals. Additionally, DSP 1206 determines the background noise level of the local environment from the signals detected by microphone 1212 and sets the gain of microphone 1212 to a level selected to compensate for the natural tendency of the user of the mobile station 1202.

The CODEC 1214 includes the ADC 1216 and DAC 1218. The memory 1222 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1222 may be, but not limited to, a single memory, CD, DVD, ROM, RAM, EEPROM, optical storage, or any other non-volatile or non-transitory storage medium capable of storing digital data.

An optionally incorporated SIM card 1226 carries, for instance, important information, such as the cellular phone number, the carrier supplying service, subscription details, and security information. The SIM card 1226 serves primarily to identify the mobile station 1202 on a radio network. The card 1226 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising:
retrieving, by at least one processor from one or more sensors of a mobile device over a communications network, trajectory data comprising a plurality of data points defining a trajectory;
iteratively executing, by the at least one processor, a set of operations until a termination condition is met, the set of operations comprising:
selecting an observation point associated with one of the plurality of data points, and
calculating a set of visible points comprising one or more data points from the plurality of data points, such that the set of visible points are associated with the observation point based on a predefined visibility context criterion retrieved from a map database;
identifying, by the at least one processor, a changing point from the plurality of data points based on the iterative execution of the set of operations until the termination condition is met;
generating, by the at least one processor, an anonymized sub-trajectory for the trajectory such that the changing point indicates a starting point of the anonymized sub-trajectory; and
outputting, by the least one processor, the anonymized sub-trajectory to at least one location-based service.

2. The method of claim 1, wherein the changing point is identified based on a comparison between location information of the changing point and location information of a corresponding previous data point from the plurality of data points.

3. The method of claim 1, wherein the visibility context criterion is predefined based on map data associated with a location of the trajectory.

4. The method of claim 1, further comprising:
processing the anonymized sub-trajectory to introduce a gap overlapping with the changing point; and
outputting the processed anonymized sub-trajectory in place of a part of the trajectory.

5. The method of claim 4, further comprising:
estimating a data leak risk value for the anonymized sub-trajectory based on a length of the gap, a length of the processed anonymized sub-trajectory and a length of the anonymized sub-trajectory; and
outputting the processed anonymized sub-trajectory in place of the part of the trajectory when the estimated data leak risk value is less than a privacy threshold value.

6. The method of claim 4,
wherein the anonymized the sub-trajectory is generated from the trajectory based on one or more anonymization parameters, and wherein the one or more anonymization parameters include at least the changing point, and a gap length of the gap.

7. The method of claim 1, further comprising:
identifying one or more changing points from the plurality of data points based on a set of visible points for each of the plurality of data points, wherein the set of visible points for each of the plurality of data points are determined based on the iterative execution of the set of operations until the termination condition is met; and
generating a plurality of anonymized sub-trajectories from the trajectory such that the one or more changing points indicate a starting point of a corresponding anonymized sub-trajectory.

8. The method of claim 7, further comprising:
processing the plurality of anonymized sub-trajectories to introduce a gap overlapping with at least one changing point of the plurality of anonymized sub-trajectories; and
outputting the processed plurality of anonymized sub-trajectories in place of the trajectory.

9. The method of claim 8, wherein when a minimum number of the plurality of anonymized sub-trajectories to generate and a minimum gap length for the gap are predefined, the method further comprises:
processing the plurality of anonymized sub-trajectories to introduce the gap overlapping with at least one changing point such that a number of changing points not replaced with the gap is minimized.

10. An apparatus comprising at least one processor and at least one non-transitory memory including computer program code instructions, the computer program code instructions configured to, when executed, cause the apparatus to:
retrieve, by the at least one processor from one or more sensors of a mobile device over a communications network, trajectory data comprising a plurality of data points defining a trajectory;
iteratively execute, by the at least one processor, a set of operations until a termination condition is met, the set of operations comprising:

selecting an observation point associated with one of the plurality of data points, and calculating a set of visible points comprising one or more data points from the plurality of data points, such that the set of visible points are associated with the observation point based on a predefined visibility context criterion;

identify, by the at least one processor, a changing point from the plurality of data points based on the iterative execution of the set of operations until the termination condition is met;

generate, by the at least one processor, an anonymized sub-trajectory for the trajectory such that the changing point indicates a starting point of the anonymized sub-trajectory; and output, by the least one processor, the anonymized sub-trajectory to at least one location-based service.

11. The apparatus of claim 10, wherein the changing point is identified based on a comparison between location information of the changing point and location information of a corresponding previous data point from the plurality of data points.

12. The apparatus of claim 10, wherein the visibility context criterion is predefined based on map data associated with a location of the trajectory.

13. The apparatus of claim 10, wherein the computer program code instructions are further configured to cause the apparatus to:

process the anonymized sub-trajectory to introduce a gap overlapping with the changing point; and output the processed anonymized sub-trajectory in place of a part of the trajectory.

14. The apparatus of claim 13, wherein the computer program code instructions are further configured to cause the apparatus to:

estimate a data leak risk value for the anonymized sub-trajectory based on a length of the gap, a length of the processed anonymized sub-trajectory and a length of the anonymized sub-trajectory; and output the processed anonymized sub-trajectory in place of the part of the trajectory when the estimated data leak risk value is less than a privacy threshold value.

15. The apparatus of claim 13, wherein the sub-trajectory is generated from the trajectory based on one or more anonymization parameters, and wherein the one or more anonymization parameters include at least the changing point, and a gap length of the gap.

16. The apparatus of claim 10, wherein the computer program code instructions are further configured to cause the apparatus to:

identify one or more changing points from the plurality of data points based on a set of visible points for each of the plurality of data points, wherein the set of visible points for each of the plurality of data points are calculated based on the iterative execution of the set of operations until the termination condition is met; and generate a plurality of anonymized sub-trajectories from the trajectory such that the one or more changing points indicate a starting point of a corresponding anonymized sub-trajectory.

17. The apparatus of claim 16, wherein the computer program code instructions are further configured to cause the apparatus to:

process the plurality of anonymized sub-trajectories to introduce a gap overlapping with the one or more changing points of the plurality of anonymized sub-trajectories; and output the processed plurality of anonymized sub-trajectories in place of the trajectory.

18. The apparatus of claim 16, wherein when a minimum number of the plurality of sub-trajectories to generate and a minimum gap length for the gap are predefined, the computer program code instructions are further configured to cause the apparatus to:

process the plurality of anonymized sub-trajectories to introduce the gap overlapping with at least one changing point such that a number of changing points not replaced with the gap is minimized.

19. A non-transitory computer-readable storage medium having computer program code instructions stored therein, the computer program code instructions, when executed by at least one processor, cause the at least one processor to:

retrieve, by the at least one processor from one or more sensors of a mobile device over a communications network, trajectory data comprising a plurality of data points defining a trajectory;

iteratively execute, by the at least one processor, a set of operations until a termination condition is met, the set of operations comprising:

selecting an observation point associated with one of the plurality of data points, and calculating a set of visible points comprising one or more data points from the plurality of data points, such that the set of visible points are associated with the observation point based on a predefined visibility context criterion;

identify, by the at least one processor, a changing point from the plurality of data points based on the iterative execution of the set of operations until the termination condition is met;

generate, by the at least one processor, an anonymized sub-trajectory for the trajectory such that the changing point indicates a starting point of the anonymized sub-trajectory; and output, by the at least one processor, the anonymized sub-trajectory to at least one location-based service.

20. The non-transitory computer-readable storage medium of claim 19, wherein the computer program code instructions, when executed by the at least one processor, cause the at least one processor to:

process the anonymized sub-trajectory to introduce a gap overlapping with the changing point; and output the processed anonymized sub-trajectory in place of a part of the trajectory.

* * * * *